United States Patent
Inazumi

(10) Patent No.: US 9,816,886 B2
(45) Date of Patent: Nov. 14, 2017

(54) FORCE DETECTION APPARATUS AND ROBOT

(71) Applicant: Seiko Epson Corporation, Tokyo (JP)

(72) Inventor: Mitsuhiro Inazumi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/887,698

(22) Filed: Oct. 20, 2015

(65) Prior Publication Data
US 2016/0109311 A1    Apr. 21, 2016

(30) Foreign Application Priority Data
Oct. 21, 2014 (JP) .................. 2014-214249

(51) Int. Cl.
G01L 5/16 (2006.01)
G01L 1/16 (2006.01)
G01L 5/22 (2006.01)

(52) U.S. Cl.
CPC .............. *G01L 5/167* (2013.01); *G01L 1/16* (2013.01); *G01L 5/226* (2013.01)

(58) Field of Classification Search
CPC ............ G01L 5/167; G01L 5/226; G01L 5/16
See application file for complete search history.

(56) References Cited

U.S. PATENT DOCUMENTS

| | | | |
|---|---|---|---|
| 3,640,130 A * | 2/1972 | Spescha | B23Q 1/34 73/862.043 |
| 4,320,392 A * | 3/1982 | Giovinazzo | B25J 13/085 200/6 A |
| 4,762,006 A | 8/1988 | Asakawa et al. | |
| 4,862,751 A * | 9/1989 | Asakawa | G01L 1/044 73/862.044 |
| 5,512,794 A * | 4/1996 | Kubler | G01P 15/18 310/329 |
| 5,677,487 A * | 10/1997 | Hansen | G01P 15/0915 310/329 |
| 5,821,432 A | 10/1998 | Sidler et al. | |
| 5,962,787 A * | 10/1999 | Okada | G01P 15/18 73/514.16 |
| 5,996,412 A * | 12/1999 | Hansen | G01P 15/0915 73/514.34 |
| 6,990,867 B2 * | 1/2006 | Okada | G01L 5/165 73/780 |

(Continued)

FOREIGN PATENT DOCUMENTS

JP    61-292029 A    12/1986
JP    63-139681 A     6/1988
(Continued)

*Primary Examiner* — Lisa Caputo
*Assistant Examiner* — Tran M Tran
(74) *Attorney, Agent, or Firm* — Harness, Dickey & Pierce, P.L.C.

(57) ABSTRACT

A force detection apparatus includes a first member, a second member, and a third member, the second member and the first member sandwich a plurality of piezoelectric elements (in a narrow sense, a first piezoelectric element and a second piezoelectric element), and the third member and the first member sandwich a plurality of piezoelectric elements (in a narrow sense, a third piezoelectric element and a fourth piezoelectric element) different from the plurality of piezoelectric elements sandwiched by the second member and the first member.

16 Claims, 14 Drawing Sheets

(56) References Cited

U.S. PATENT DOCUMENTS

| | | | | |
|---|---|---|---|---|
| 7,360,455 | B2* | 4/2008 | Okada | B81B 3/0021 |
| | | | | 73/862.043 |
| 8,156,823 | B2* | 4/2012 | Kim | G01L 5/16 |
| | | | | 73/862.041 |
| 8,627,909 | B2* | 1/2014 | Chang | A61H 3/04 |
| | | | | 135/67 |
| 8,726,740 | B1* | 5/2014 | Mekid | B23Q 17/0966 |
| | | | | 73/862.041 |
| 9,274,015 | B2* | 3/2016 | Schlipf | G01L 5/161 |
| 9,410,856 | B2* | 8/2016 | Kamiya | G01L 1/16 |

FOREIGN PATENT DOCUMENTS

| | | |
|---|---|---|
| JP | 10-068665 A | 3/1998 |
| JP | 2013-130433 A | 7/2013 |
| JP | 2013-160669 A | 8/2013 |

\* cited by examiner

FORCE DETECTION APPARATUS AND ROBOT

BACKGROUND

1. Technical Field

The present invention relates to a force detection apparatus, a robot, etc.

2. Related Art

Recently, introduction of industrial robots to production facilities including factories has been promoted for improvement of production efficiency. As the industrial robots, machine tools for machining of parent materials including aluminum plates are representative. Some machine tools contain force detection apparatuses that detect forces on the parent materials at machining (for example, see JP-A-10-68665).

The force detection apparatus disclosed in JP-A-10-68665 may detect shear, tensile force, compression force, etc. using crystal as a piezoelectric element.

However, in the force detection apparatus using crystal as a piezoelectric element, the crystal is deformed due to heat generated in machining and, as a result, a noise component with respect to the true value in output of the piezoelectric element is generated. In the force detection apparatus disclosed in JP-A-10-68665, no measures against the noise are taken.

SUMMARY

An aspect of the invention relates to a force detection apparatus including a first member, a second member, and a third member, in which the second member and the first member sandwich a plurality of piezoelectric elements, and the third member and the first member sandwich a plurality of piezoelectric elements different from the plurality of piezoelectric elements sandwiched by the second member and the first member.

In one aspect of the invention, the second member and the first member sandwich the plurality of piezoelectric elements and the third member and the first member sandwich the other plurality of piezoelectric elements. Accordingly, when a force is applied to one of the second member and the third member, the force is transmitted to the first member via the piezoelectric elements, and further transmitted to the other member of the second member and the third member via the other piezoelectric elements. Namely, it is assumed that the forces detected by the plurality of piezoelectric elements sandwiched by the second member and the first member and the forces detected by the plurality of piezoelectric elements sandwiched by the third member and the first member are equal, and thereby, appropriate elements of the piezoelectric elements contained in the force detection apparatus may be selected to calculate an external force and external forces can be detected with higher accuracy.

Further, in the aspect of the invention, the plurality of piezoelectric elements sandwiched by the second member and the first member may include a first piezoelectric element and a second piezoelectric element, the plurality of piezoelectric elements sandwiched by the third member and the first member may include a third piezoelectric element and a fourth piezoelectric element, the first member may have first and second side surfaces and third and fourth side surfaces intersecting with the first and second side surfaces, the second member may have a first surface opposed to the first side surface of the first member and a second surface opposed to the second side surface of the first member, the third member may have a first surface opposed to the third side surface of the first member and a second surface opposed to the fourth side surface of the first member, the first piezoelectric element may be provided between the first surface of the second member and the first side surface of the first member, the second piezoelectric element may be provided between the second surface of the second member and the second side surface of the first member, the third piezoelectric element may be provided between the first surface of the third member and the third side surface of the first member, and the fourth piezoelectric element may be provided between the second surface of the third member and the fourth side surface of the first member.

Thereby, the force detection apparatus according to the embodiment can be realized by a specific structure (e.g. a universal joint shape).

In the aspect of the invention, the second member may have a third surface intersecting with the first surface and the second surface of the second member, the third member may have a third surface intersecting with the first surface and the second surface of the third member, the third surface of the second member may be opposed to a lower surface of the first member, and the third surface of the third member may be opposed to an upper surface of the first member.

Thereby, the force detection apparatus according to the embodiment can be realized by a specific structure (e.g. a universal joint shape).

In the aspect of the invention, the first piezoelectric element may be attached to the first surface of the second member, the second piezoelectric element may be attached to the second surface of the second member, the third piezoelectric element may be attached to the first surface of the third member, and the fourth piezoelectric element may be attached to the second surface of the third member.

Thereby, the piezoelectric elements may be attached to appropriate parts of the force detection apparatus.

In the aspect of the invention, the first piezoelectric element may be attached to the first side surface of the first member, the second piezoelectric element may be attached to the second side surface of the first member, the third piezoelectric element may be attached to the third side surface of the first member, and the fourth piezoelectric element may be attached to the fourth side surface of the first member.

Thereby, the piezoelectric elements may be attached to appropriate parts of the force detection apparatus.

In the aspect of the invention, a processing unit that, supposing that a direction from the first side surface to the second side surface is a first direction and a direction from the third side surface to the fourth side surface is a second direction, obtains an external force in the first direction based on forces detected by the third piezoelectric element and the fourth piezoelectric element may be provided.

Thereby, when a force in a given direction is obtained, information with less errors (shearing forces) can be used.

In the aspect of the invention, a processing unit that, supposing that a direction from the first side surface to the second side surface is a first direction and a direction from the third side surface to the fourth side surface is a second direction, obtains an external force in the second direction based on forces detected by the first piezoelectric element and the second piezoelectric element may be provided.

Thereby, when a force in a given direction is obtained, information with less errors (shearing force) can be used.

In the aspect of the invention, supposing that a direction intersecting the first direction and the second direction is a third direction, the processing unit may obtain an external
} force in the third direction based on forces detected by the first to fourth piezoelectric elements.

Thereby, when a force in a given direction is obtained, information with less errors (shearing forces) can be used.

Another aspect of the invention relates to a robot including the force detection apparatus described above.

In the aspect of the invention, in the force detection apparatus contained in the robot, the second member and the first member sandwich the plurality of piezoelectric elements and the third member and the first member sandwich the other plurality of piezoelectric elements. Accordingly, when a force is applied to one of the second member and the third member, the force is transmitted to the first member via the piezoelectric elements, and further transmitted to the other member of the second member and the third member via the other piezoelectric elements. Namely, it is assumed that the forces detected by the plurality of piezoelectric elements sandwiched by the second member and the first member and the forces detected by the plurality of piezoelectric elements sandwiched by the third member and the first member are equal, and thereby, appropriate elements of the piezoelectric elements contained in the force detection apparatus may be selected to calculate an external force and external forces can be detected with higher accuracy and appropriate robot control or the like based thereon can be performed.

As described above, according to the several aspects of the invention, a force detection apparatus, a robot, etc. that detect external forces with higher accuracy while suppressing influences by temperature fluctuations etc.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, an embodiment will be described. The embodiment to be described does not unduly limit the subject matter of the invention described in the appended claims. Further, not all configurations explained in the embodiment are necessarily the essential component elements of the invention.

1. Technique of Embodiment

First, a technique of the embodiment will be explained. As disclosed in JP-A-10-68665, a technique of realizing a force detection apparatus using piezoelectric elements (e.g. elements using crystal) is known. However, the piezoelectric element has a difference in characteristics (anisotropy) between an in-plane force of the element (hereinafter, referred to as "shearing force") and a force in the normal direction of the element (hereinafter, referred to as "compression/tensile force").

Specifically, the characteristics of the shearing force less varies depending on the temperature, while the characteristics of the compression/tensile force largely changes depending on the temperature. Specifically, conceivable factors include temperature characteristics of materials and mechanical shape changes due to heat.

For example, the case where the force detection apparatus is used for an industrial robot having an arm with an end effector attached thereto is considered. In this case, members (e.g. a first member 1, a second member 2, a third member 3, which will be described later) are heated, and thermally expanded and deformed by heat transfer from a heat source of motors etc. provided in the arm and the end effector. By the deformation, preload to the piezoelectric element changes from a predetermined value. The preload change to the piezoelectric element is included to the extent that significantly affects the compression/tensile force (specifically, charge corresponding to the compression/tensile force) as a noise component due to a temperature change of the force detection apparatus.

Figure 1A:
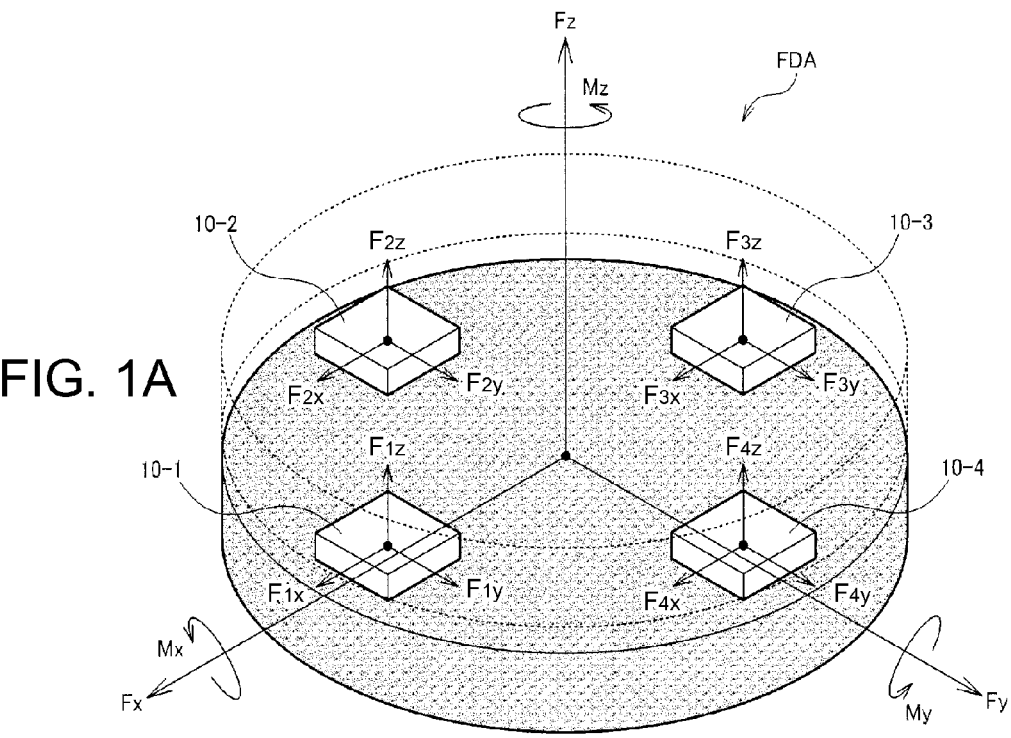
FIGS. 1A and 1B show a configuration example of a force detection apparatus in a technique of related art.
Figure 1B:
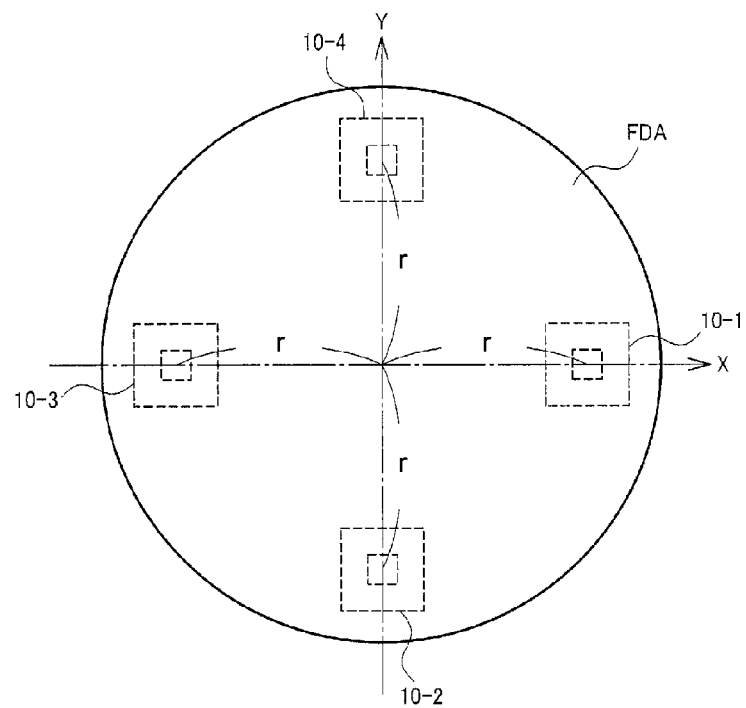

As a related art example of the force detection apparatus using piezoelectric elements, a structure shown in FIGS. 1A and 1B is considered. In the example of FIG. 1A, four piezoelectric elements 10-1 to 10-4 (specifically, sensor devices 6-1 to 6-4, which will be described later) are arranged on an XY-plane of an apparatus coordinate system set in the force detection apparatus FDA. Note that, in techniques of the related art example (FIG. 1A etc.), a comparative example (FIG. 2A etc.) to be described later, and the embodiment (FIG. 8 etc.) to be described later, the piezoelectric elements themselves may be used in common and the signs of the piezoelectric elements are commonalized in the specification and the drawings. Also, note that the piezoelectric element according to the embodiment is not limited to one having the same structure as that of related art, but a different structure may be used.

All of the directions of an X-axis, a Y-axis, and a Z-axis of an element coordinate system set for each piezoelectric element are aligned with an X-axis, a Y-axis, and a Z-axis of the apparatus coordinate system. FIG. 1B is a view of the arrangement of FIG. 1A from above (from the positive direction along the Z-axis of the apparatus coordinate system). The output values of the respective piezoelectric elements are translational forces on the X-axis, the Y-axis, and the Z-axis of the element coordinate systems set for the piezoelectric elements.

In the case where the four piezoelectric elements are arranged on the XY-plane of the apparatus coordinate system and the coordinate axes of the apparatus coordinate system and the coordinate axes of the element coordinate systems are aligned as shown in FIG. 1A, specifically, as shown in FIG. 1B, an example in which origins of the respective unit coordinate systems are placed at (r,0,0), (0,r,0), (−r,0,0), (0,−r,0) is considered.

Supposing that the output of the piezoelectric element 10-1 is $(F_{1x}, F_{1y}, F_{1z})$, the output of the piezoelectric element 10-2 is $(F_{2x}, F_{2y}, F_{2z})$, the output of the piezoelectric element 10-3 is $(F_{3x}, F_{3y}, F_{3z})$ and the output of the piezoelectric element 10-4 is $(F_{4x}, F_{4y}, F_{4z})$. In this case, assuming that, as the whole force detection apparatus, transitional forces Fx, Fy, Fz on the X, Y, Z axes of the apparatus coordinate system and moment about the respective axes Mx, My, Mz are detected, the respective values may be obtained by the following equations (1).

$$Fx = F_{1x} + F_{2x} + F_{3x} + F_{4x}$$

$$Fy = F_{1y} + F_{2y} + F_{3y} + F_{4y}$$

$$Fz = F_{1z} + F_{2z} + F_{3z} + F_{4z}$$

$$Mx = r(F_{4z} - F_{2z})$$

$$My = r(F_{3z} - F_{1z})$$

$$Mz = r(F_{1y} - F_{3y} + F_{2x} - F_{4x}) \qquad (1)$$

Namely, calculation processing is performed based on the output values from the respective piezoelectric elements, and thereby, the force detection apparatus shown in FIG. 1A can be used as a six-axis sensor.

However, in the above described example, $F_{1x}$, $F_{1y}$, $F_{2x}$, $F_{2y}$, $F_{3x}$, $F_{3y}$, $F_{4x}$, $F_{4y}$ are in-plane forces of the piezoelectric elements, i.e., searing forces, and $F_{1z}$, $F_{2z}$, $F_{3z}$, $F_{4z}$ are forces in the normal directions of the piezoelectric elements, i.e., compression/tensile forces. That is, the force Fz in the Z-axis direction (the force in a direction of penetration of the paper in FIG. 1B) and the moment about the X-axis and the Y-axis shown in the equations (1) are calculated using the compression/tensile forces, and errors due to temperature changes may occur as described above and there is problem of difficulty in highly accurate detection of external forces.

Figure 2A:
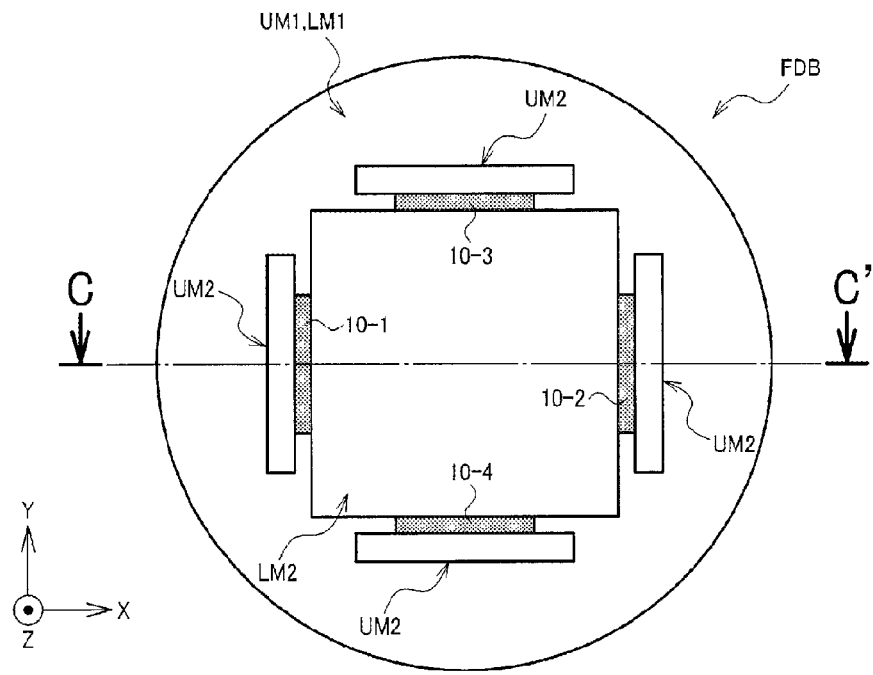
FIGS. 2A and 2B show a configuration example of a force detection apparatus in a comparative example.
Figure 2B:
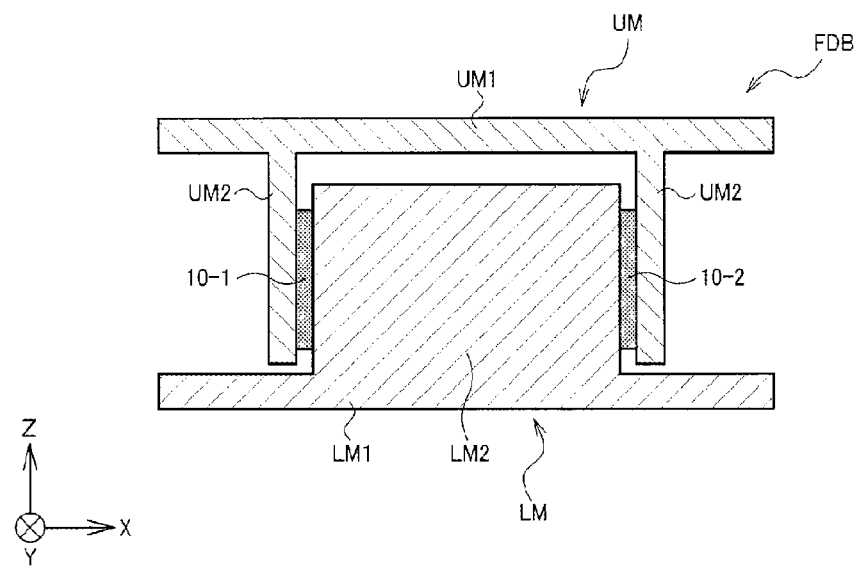

On the other hand, without using the compression/tensile forces $(F_{1z}, F_{2z}, F_{3z}, F_{4z})$ for calculation of the outputs of the force detection apparatus, the external forces can be detected with higher accuracy. FIGS. 2A and 2B show an example of the force detection apparatus FDB in an comparative example to the embodiment.

In the structure of the comparative example, a square-shaped column is stood from the lower surface of the force detection apparatus and the piezoelectric elements are arranged on the four side surfaces and connected to the upper surface as shown in FIG. 2B for detection of all of the external forces applied to the upper surface as shearing forces of the piezoelectric elements.

The structure can be realized by placing e.g. a lower member LM having a plate surface LM1 and a square-shaped column LM2 and an upper member UM having a plate surface UM1 and four wall surfaces UKM2 in a relationship shown in FIG. 2B. The structure is seen from the vertical direction as shown in FIG. 2A, and the four piezoelectric elements 10-1 to 10-4 are sandwiched between the column LM2 and the wall surfaces UM2. FIG. 2B is a sectional view along C-C' in FIG. 2A.

Figure 3A:
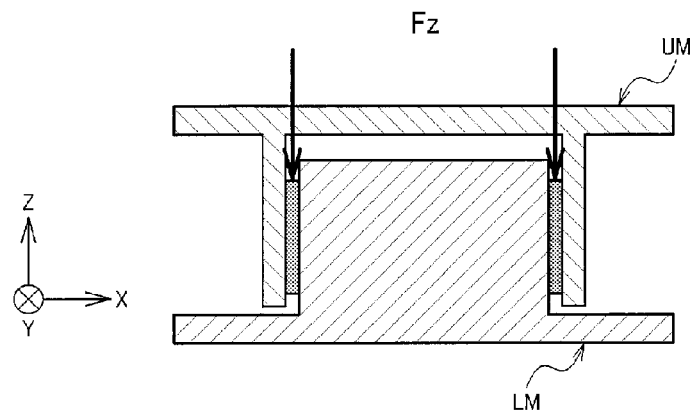
FIGS. 3A to 3C are explanatory diagrams of a technique of obtaining a Z-axis translational force and moment about respective axes of X, Y, and Z in the comparative example.
Figure 3B:
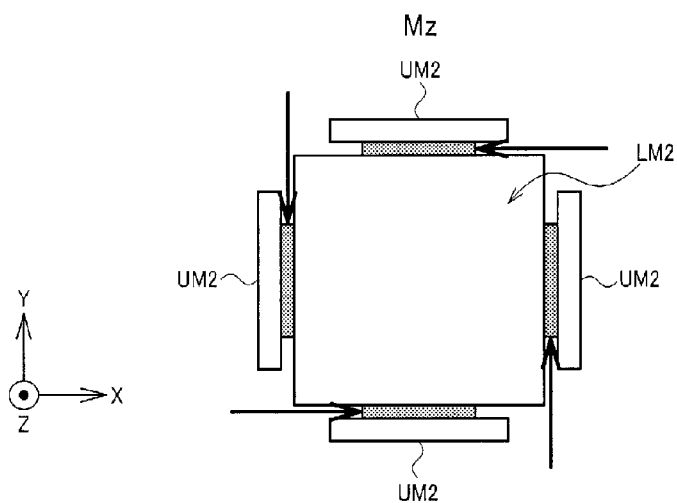
Figure 3C:
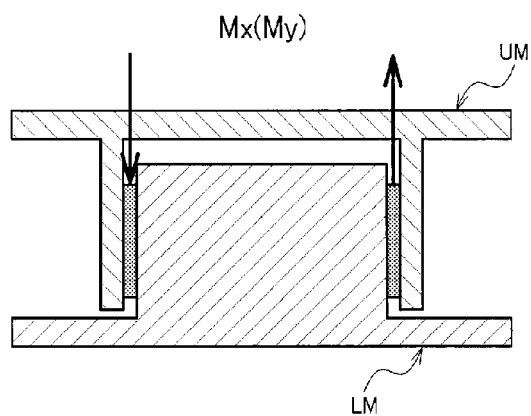

In the structure, for example, the compression/tensile force from the upper surface as the transitional force in the Z-axis direction can be detected as shearing forces of the four sensors as shown in FIG. 3A. Similarly, the moment about the Z-axis can also be detected as shearing forces of the four sensors as shown in FIG. 3B. Further, the moment about the X-axis and the moment about the Y-axis can be detected by combinations of the shearing forces of the two sensors of the four sensors as shown in FIG. 3C.

Figure 4:
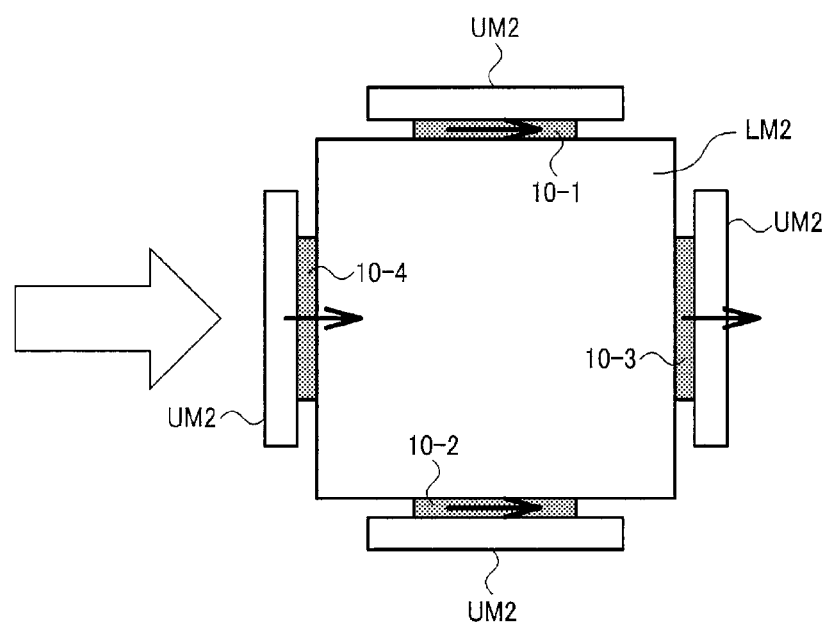
FIG. 4 is an explanatory diagram of a technique of obtaining an X-axis or Y-axis translational force in the comparative example.

On the other hand, forces from the side surfaces as shown in FIG. 4 are considered. In this case, the first piezoelectric element 10-1 and the second piezoelectric element 10-2 receive the external forces as shearing forces, and the third piezoelectric element 10-3 and the fourth piezoelectric element 10-4 receive the external forces as compression forces. However, when the fourfold symmetry of the sensors is sufficiently highly accurate, the forces received by the first to fourth piezoelectric elements are equal, one fourth for each. Namely, in this case, only the in-plane shearing forces received by the piezoelectric element 10-1 and the second piezoelectric element 10-2 are considered, the sum of the forces is doubled, and thereby, the forces from the side surfaces can be detected.

Figure 5A:
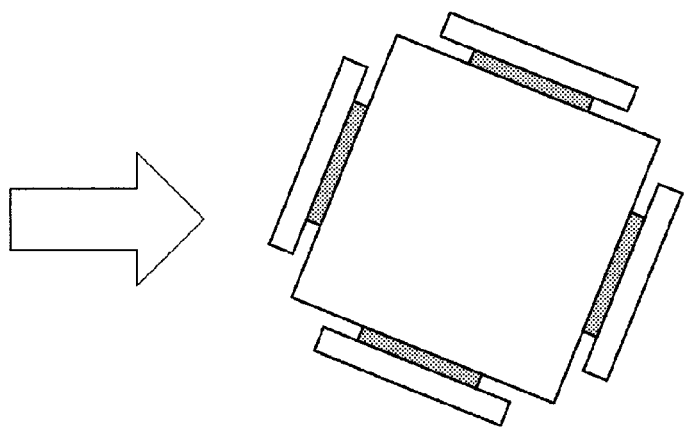
FIGS. 5A to 5C are explanatory diagrams of a technique of obtaining an X-axis or Y-axis translational force in the comparative example.
Figure 5B:
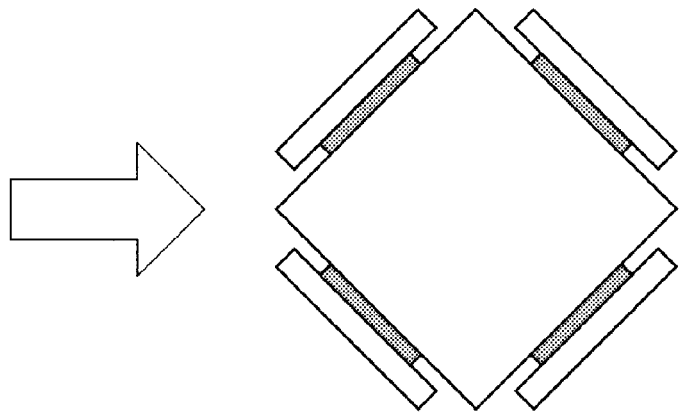
Figure 5C:
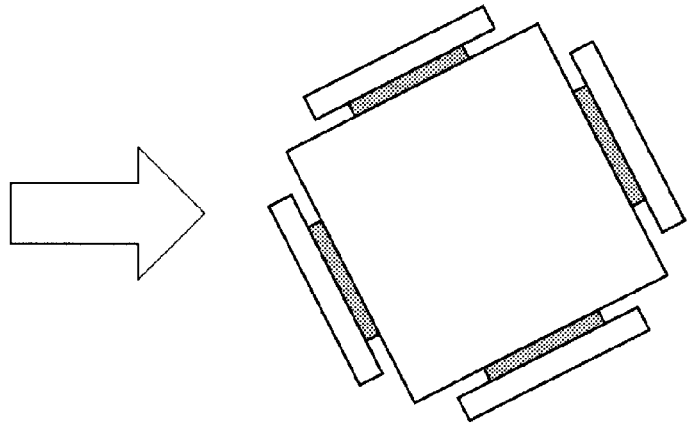

The case in FIG. 4 is an example from a certain specific direction, and, in consideration of the symmetry of the structure, external forces from arbitrary directions as shown in FIGS. 5A to 5C can be detected. In this case, the sum of the in-plane shearing forces of the four piezoelectric elements is doubled.

In the case of the comparative example, all of the transitional forces Fx, Fy, Fz of the three axes of the force detection apparatus FDB and the moment Mx, My, Mz about the respective axes are calculated using the shearing forces detected in the respective piezoelectric elements (without using the compression/tensile forces). Accordingly, it may be considered that the external forces can be detected with higher accuracy.

However, the comparative example remains problematic. This is because the above explanation is on the assumption that the force detection apparatus has the fourfold symmetry with sufficient accuracy. In reality, the case with insufficient fourfold symmetry is adequately considered due to machining errors and assembly errors. In this case, unless the assumption that the forces received by the respective piezoelectric elements are equal holds, the value obtained by doubling the sum of the shearing forces do not accurately express the magnitude of the external force. That is, in order to use the technique of the comparative example, there is a problem that very high accuracy is required for machining and assembly or, with insufficient accuracy, some technique for correction of the errors may be used in combination.

Accordingly, the applicant proposes a force detection apparatus that can detect external forces with higher accuracy without the assumption of highly accurate symmetry. Specifically, a force detection apparatus FD includes the first member 1, the second member 2, and the third member 3, the second member 2 and the first member 1 sandwich a plurality of piezoelectric elements, and third member 3 and the first member 1 sandwich a plurality of piezoelectric elements different from the plurality of piezoelectric elements sandwiched by the second member 2 and the first member 1. The specific structure example is shown in FIGS. 6A and 6B, a universal joint-shaped structure as shown in FIG. 6C.

In the case of the configuration, if an external force is applied to the second member 2, the external force is transmitted to the first member 1 via the plurality of piezoelectric elements (a first group of piezoelectric elements) sandwiched by the second member 2 and the first member 1, and the transmitted force is transmitted to the third member 3 via the plurality of piezoelectric elements (a second group of piezoelectric elements) sandwiched by the first member 1 and the third member 3. Namely, the force acting on the first group of piezoelectric elements and the force acting on the second group of piezoelectric elements are equal.

Accordingly, even when an external force acts on the first group of piezoelectric elements as a compression/tensile force, a force having the same magnitude as the external force acts on the second group of piezoelectric elements. Therefore, the plane directions are set to be different between the first group of piezoelectric elements and the second group of piezoelectric elements (in a narrow sense, set to be orthogonal), and thereby, a force having the same magnitude as the external force acts as a shearing force on the second group of piezoelectric elements.

Figure 6A:
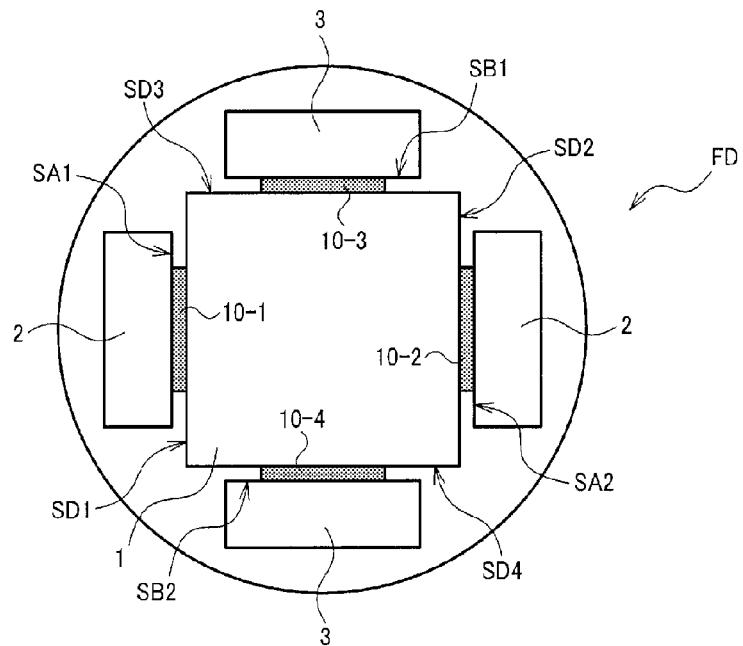
FIGS. 6A to 6C show a schematic configuration example of a force detection apparatus according to an embodiment.
Figure 6B:
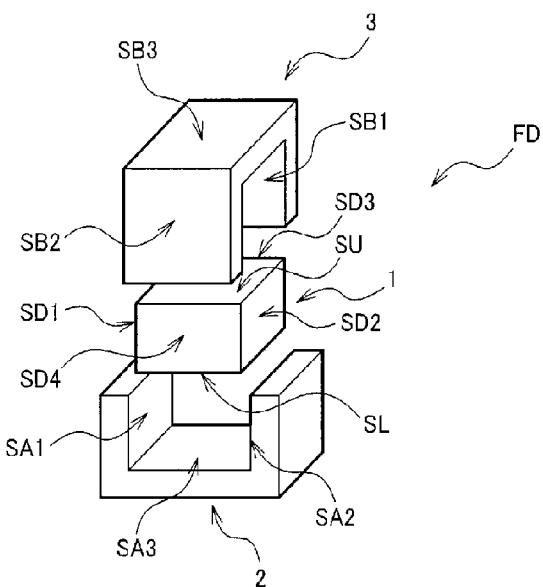
Figure 6C:
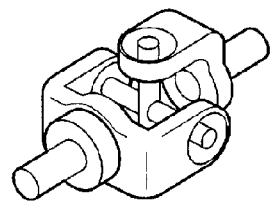
Figure 7:
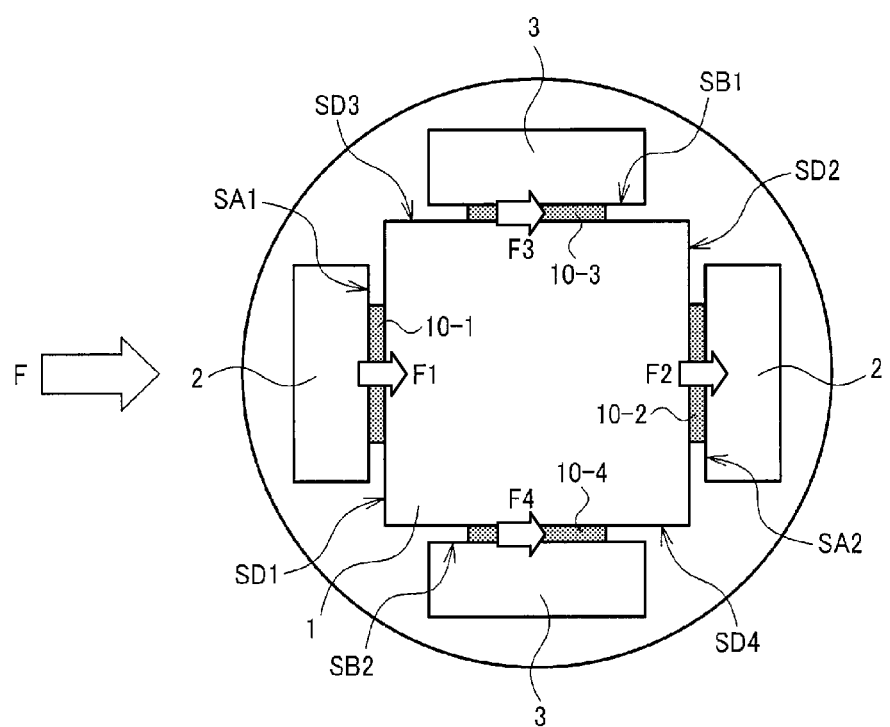
FIG. 7 is an explanatory diagram of a technique of obtaining an X-axis or Y-axis translational force in the embodiment.

For example, when an external force F shown in FIG. 7 acts on the structure shown in FIGS. 6A and 6B, the external force F is the sum of the compression force F1 of the first piezoelectric element 10-1 and the compression force F2 of the second piezoelectric element 10-2 sandwiched by the second member 2 and the first member 1 and the sum of the shearing force F3 of the third piezoelectric element 10-3 and the shearing force F4 of the fourth piezoelectric element 10-4 sandwiched by the first member 1 and the third member 3. Namely, the external force F in this case may be obtained by F3+F4 as the sum of the shearing forces.

Here, the example in which the external force is applied to the second member 2 is explained, however, the same applies to the case where an external force is applied to the third member 3. Consequently, the force component (compression/tensile force) in the normal direction of the surface applied to one of the second member 2 and the third member 3 is balanced with the force in the in-plane shear direction of the other. This shows that, when the same coordinate systems as those in FIGS. 1A and 1B are used, Fx and Fy are obtained from the shearing forces.

Further, the details will be described later using FIGS. 12B to 13B etc., and the transitional force Fz in the Z-axis direction and the moment Mx, My, Mz about the respective axes can be calculated from shearing forces without using compression/tensile forces. This may be derived from the balance among the forces, and the highly accurate symmetry is not required unlike the comparative example.

As below, the specific structure of the force detection apparatus FD according to the embodiment will be explained, and subsequently, the structure of the piezoelectric element 10 (and the sensor device including the piezoelectric element 10) contained in the force detection apparatus FD will be explained. Further, a processing unit (external force output circuit) that calculates an external force based on outputs from the respective sensor devices will be explained, and finally, application examples of the force detection apparatus of the embodiment will be explained.

2. Configuration Example of Force Detection Apparatus

The schematic structure of the force detection apparatus FD according to the embodiment is as shown in FIGS. 6A and 6B. As is known from the example in FIGS. 6A and 6B, the force detection apparatus FD of the embodiment may include the four piezoelectric elements of the first to fourth piezoelectric elements 10-1 to 10-4. The first member 1 has first and second side surfaces SD1 and SD2, and third and fourth side surfaces SD3 and SD4 intersecting with (in a narrow sense, orthogonal to) the first and second side surfaces SD1 and SD2. Further, the second member 2 has a first surface SA1 opposed to the first side surface SD1 of the first member 1 and a second surface SA2 opposed to the second side surface SD2 of the first member 1, and the third member 3 has a first surface SB1 opposed to the third side surface SD3 of the first member 1 and a second surface SB2 opposed to the fourth side surface SD4 of the first member 1.

In this case, the first piezoelectric element 10-1 may be provided between the first surface SA1 of the second member 2 and the first side surface SD1 of the first member 1 as shown in FIG. 6A. Similarly, the second piezoelectric element 10-2 is provided between the second surface SA2 of the second member 2 and the second side surface SD2 of the first member 1, the third piezoelectric element 10-3 is provided between the first surface SB1 of the third member 3 and the third side surface SD3 of the first member 1, and the fourth piezoelectric element 10-4 is provided between the second surface SB2 of the third member 3 and the fourth side surface SD4 of the first member 1.

Further, as shown in FIG. 6B, the second member 2 has a third surface SA3 intersecting with the first surface SA1 and the second surface SA2 of the second member 2, and the third surface SA3 of the second member 2 is opposed to a lower surface SL of the first member 1. Similarly, the third member 3 has a third surface SB3 intersecting with the first surface SB1 and the second surface SB2 of the third member 3, and the third surface SB3 of the third member 3 is opposed to an upper surface SU of the first member 1.

According to the force detection apparatus FD having the structure, as described above, the force component (compression/tensile force) in the normal direction of the surface applied to one of the second member 2 and the third member 3 is balanced with the force in the in-plane shear direction of the other. Further, even in consideration of an external force in another direction, Fx, Fy, Fz, Mx, My, Mz can be calculated from shearing forces without using compression/tensile forces.

Figure 8:
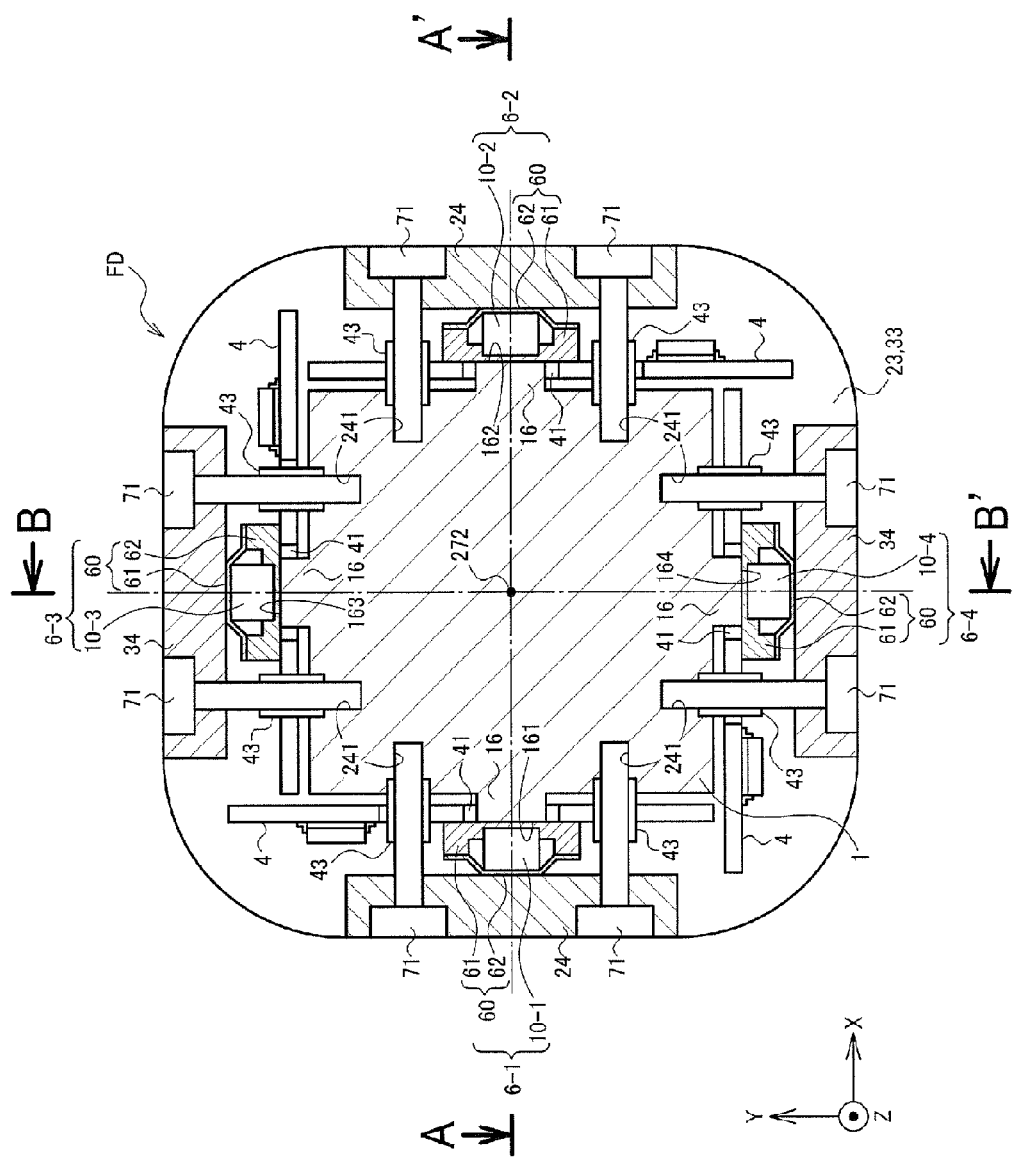
FIG. 8 shows a detailed configuration example of the force detection apparatus according to the embodiment.
Figure 9A:
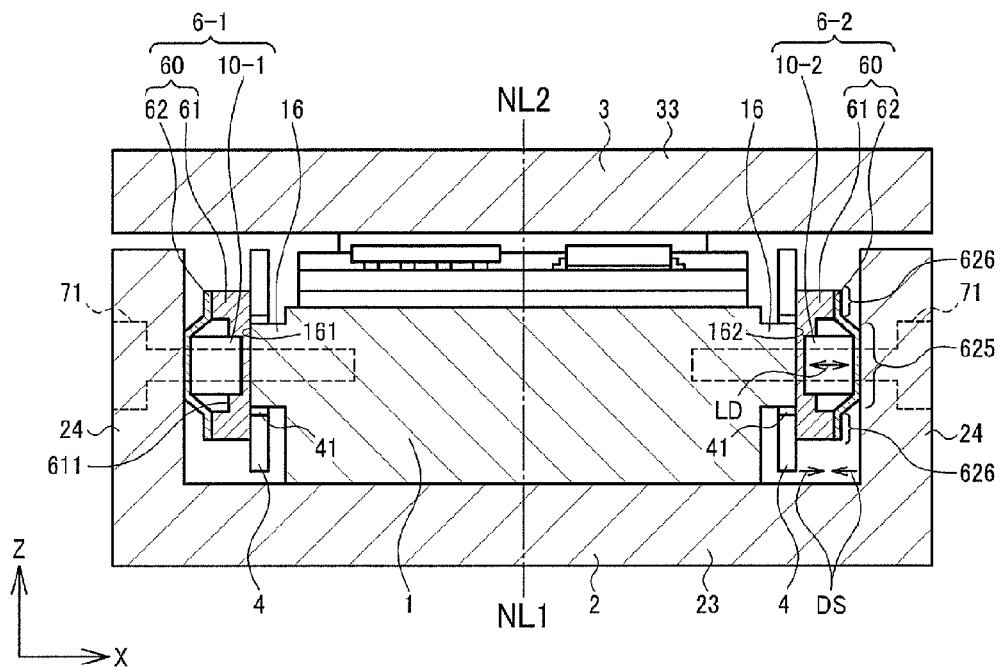
FIGS. 9A and 9B show the detailed configuration example of the force detection apparatus according to the embodiment.
Figure 9B:
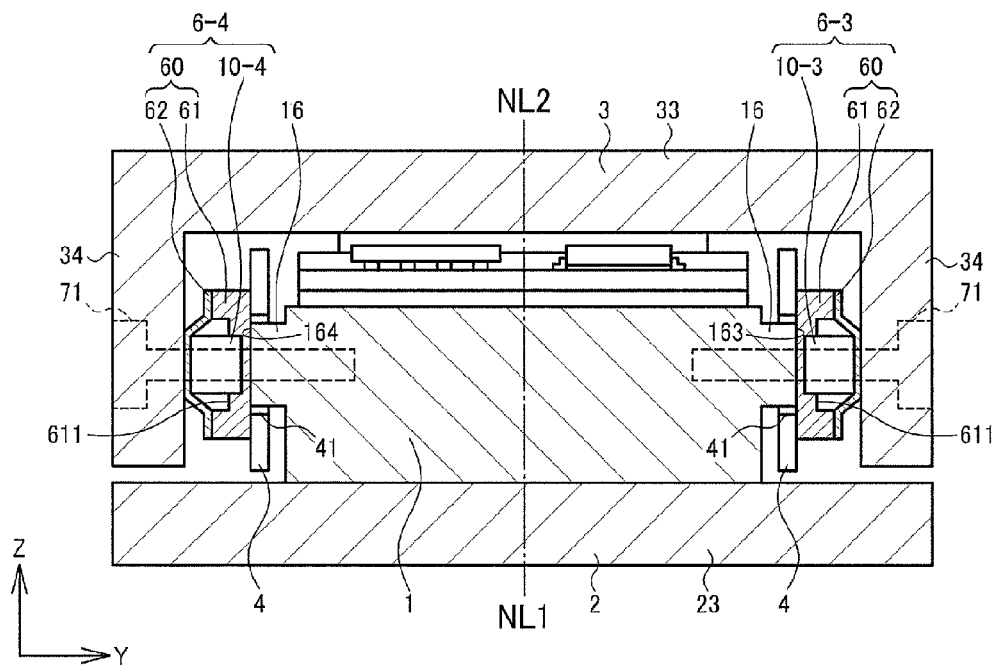

Next, the detailed configuration example of the force detection apparatus FD according to the embodiment will be explained using FIGS. 8 to 9B. When the directions of the respective axes of X, Y, Z of the apparatus coordinate system set for the force detection apparatus FD are the directions shown in FIG. 8, FIG. 9A shows a section along the X-axis (specifically, a section along A-A') and FIG. 9B shows a section along the Y-axis (specifically, a section along B-B'). Note that the structure of the force detection apparatus FD is not limited to that in FIG. 8 etc., but various modifications may be made.

In the example of FIGS. 8 to 9B, the force detection apparatus FD includes the second member 2 that functions as a base plate, the third member 3 that is provided at a predetermined distance from the second member 2 and functions as a cover plate opposed to the second member 2, and the first member 1 that is provided between the second member 2 and the third member 3 and functions as a floating block.

Further, in the example of FIGS. 8 to 9B, the force detection apparatus FD includes four analog circuit boards 4 and a digital circuit board 5 housed (provided) between the first member 1 and the third member 3 and electrically connected to the analog circuit boards 4. Furthermore, the force detection apparatus FD includes the four sensor devices 6 (6-1 to 6-4) mounted on the analog circuit boards 4 and having packages 60 for housing the piezoelectric elements 10 that output signals in response to the applied external forces, and eight pressurizing bolts (pressurizing screws) 71 as fixing members.

The first member 1 has a quadrangular column shape and can be realized using e.g. a rectangular parallelepiped or cube. In the embodiment, supposing that the first member is a hexahedron, a surface on the second member 2 side (the surface on the negative side along the Z-axis direction) is the lower surface SL, a surface on the third member 3 side (the surface on the positive side along the Z-axis) is the upper surface SU, and the other four surfaces are the first to fourth side surfaces SD1 to SD4. Note that the first member 1 is not limited to the hexahedron. For example, on the respective side surfaces of the first member 1, convex portions 16 may be formed to protrude on the surfaces facing the outside. The convex portions 16 are structures for efficiently pressurizing the sensor devices 6, and top surfaces 161 to 164 of the respective convex portions 16 are flat surfaces perpendicular to the lower surface SL and the upper surface SU.

The second member 2 has a plate-like outer shape, and its planar shape is a square with rounded corners. The second member 2 has a bottom plate 23 (corresponding to the third surface SA3) and two wall surfaces 24 stood upward from the bottom plate 23 (corresponding to the first surface SA1 and the second surface SA2). The two wall surfaces 24 have "L"-shapes and are provided along the X-axis, and the surfaces of the respective wall surfaces 24 intersect with (in a narrow sense, orthogonal to) the X-axis.

Similarly, the third member 3 has a plate-like outer shape, and its planar shape is a square with rounded corners. The third member 3 has a top plate 33 (corresponding to the third surface SB3) and two wall surfaces 34 stood downward from the top plate 33 (corresponding to the first surface SB1 and the second surface SB2). The structure of the third member 3 is the same as that of the second member 2 except that the two wall surfaces 34 are provided along the Y-axis and the surfaces of the respective wall surfaces 34 intersect with (in a narrow sense, orthogonal to) the Y-axis.

In the embodiment, when the force detection apparatus FD is fixed to e.g. a robot for use, the lower surface of the bottom plate 23 serves as an attachment surface (first attachment surface) 231 to the robot (measuring object). Further, when the force detection apparatus FD is fixed to e.g. a robot for use, the upper surface of the top plate 33 serves as an attachment surface (second attachment surface) 321 to an end effector (measuring object) mounted on the robot. The attachment surface 321 and the attachment surface 231 of the second member 2 are in parallel in a natural condition without application of an external force.

Further, the sensor device 6-1 is sandwiched between the first surface SA1 of the second member 2 and the top surface 161 of the convex portion 16 provided on the first side surface SD1 of the first member 1. Namely, the piezoelectric element 10-1 of the sensor device 6-1 is sandwiched by the first surface SA1 of the second member 2 and the top surface 161 of the first side surface SD1 of the first member 1 via the package 60 and pressurized. Hereinafter, the direction in which the device is sandwiched is referred to as "sandwich direction DS".

Figure 10:
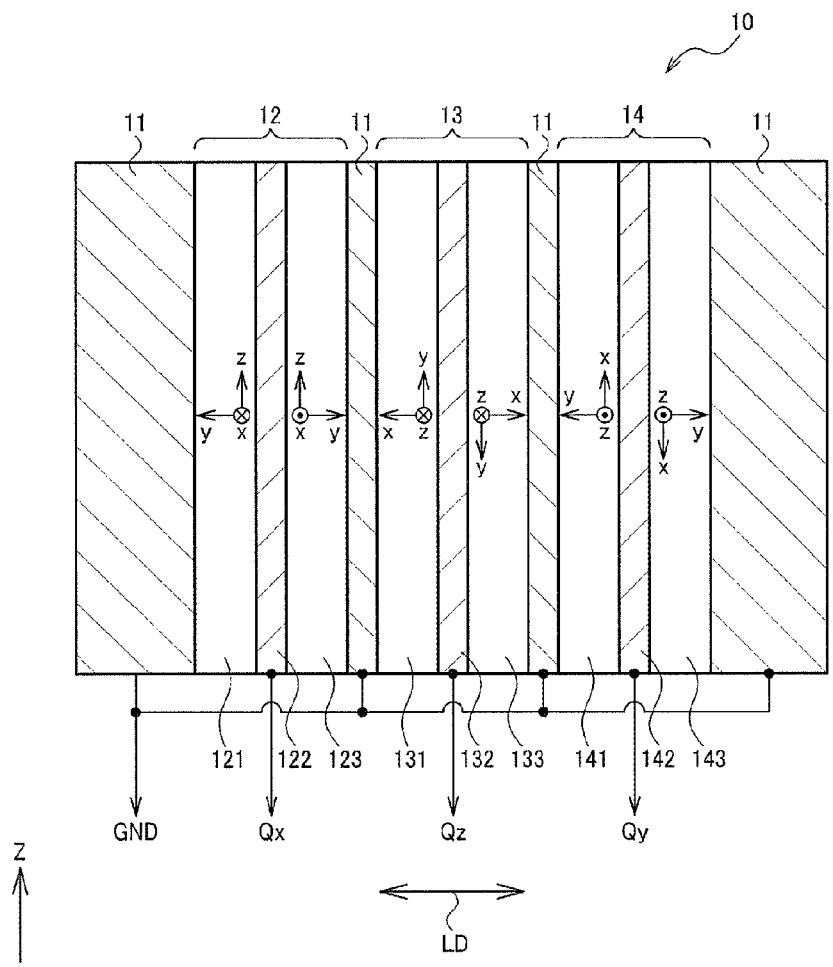
FIG. 10 shows a configuration example of a piezoelectric element.

As shown in FIGS. 8 and 10, regarding the position of the piezoelectric element 10-1 of the sensor device 6-1, the respective layers forming the piezoelectric element 10-1 is perpendicular to the bottom plate 23 (top plate 33). Namely, the stacking direction LD in which the respective layers forming the piezoelectric element 10-1 are stacked and the sandwich direction DS are in parallel to the bottom plate 23 (top plate 33).

Similarly, the sensor device 6-2 is sandwiched between the second surface SA2 of the second member 2 and the top surface 162 of the convex portion 16 provided on the second side surface SD2 of the first member 1, the sensor device 6-3 is sandwiched between the first surface SB1 of the third member 3 and the top surface 163 of the convex portion 16 provided on the third side surface SD3 of the first member 1, and the sensor device 6-4 is sandwiched between the second surface SB2 of the third member 3 and the top surface 164 of the convex portion 16 provided on the fourth side surface SD4 of the first member 1.

Figure 11:
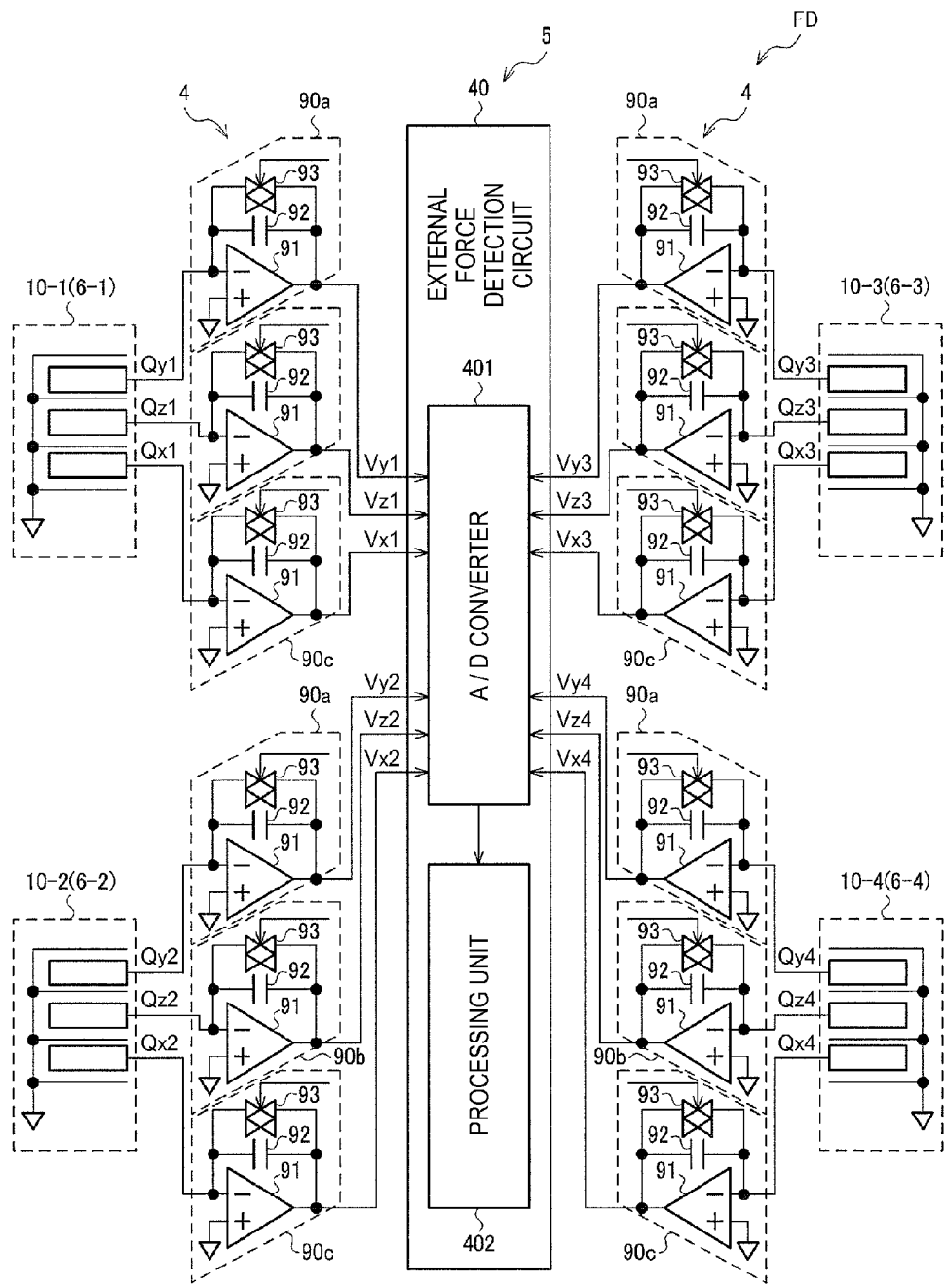
FIG. 11 shows a configuration example of conversion output circuits and an external force detection circuit.

As shown in FIG. 11, the analog circuit board 4 connected to the sensor device 6-1 includes a conversion output circuit 90a that converts charge Qy1 output from the piezoelectric element 10 of the sensor device 6-1 into a voltage Vy1, a conversion output circuit 90b that converts charge Qz1 output from the piezoelectric element 10 into a voltage Vz1, and a conversion output circuit 90c that converts charge Qx1 output from the piezoelectric element 10 into a voltage Vx1. This applies to the sensor devices 6-2 to 6-4. The details of the respective piezoelectric elements 10 and the conversion output circuits 90 will be described later using FIGS. 10 and 11.

Further, the digital circuit board 5 includes an external force detection circuit 40 that detects an applied external force. The respective analog circuit boards 4 are respectively supported by the different side surfaces of the first member 1 and protected between the first member 1 and the second member 2 or between the first member 1 and the third member 3.

The constituent materials of the first member 1, the second member 2, the third member 3, the other parts than the respective elements and the respective wires of the analog circuit boards 4, and the other parts than the respective elements and the respective wires of the digital circuit board 5 are respectively not particularly limited. For example, various resin materials, various metal materials, etc. may be used.

The first piezoelectric element 10-1 (sensor device 6-1) may be attached to the first side surface SD1 of the first member 1, the second piezoelectric element 10-2 (sensor device 6-2) may be attached to the second side surface SD2 of the first member 1, the third piezoelectric element 10-3 (sensor device 6-3) may be attached to the third side surface SD3 of the first member 1, and the fourth piezoelectric element 10-4 (sensor device 6-4) may be attached to the fourth side surface SD4 of the first member 1.

In this case, the first and second piezoelectric elements are fixed to the first member 1 and the first member 1 and the second member 2 are fastened by the pressurizing bolts 71, and thereby, given preload is provided. The third and fourth piezoelectric elements are fixed to the first member 1 and the first member 1 and the third member 3 are fastened by the pressurizing bolts 71, and thereby, given preload is provided.

Note that the attachment locations are not limited to those as long as given preload may be provided to the respective piezoelectric elements. For example, the first piezoelectric element 10-1 may be attached to the first surface SA1 of the second member 2, and the second piezoelectric element 10-2 may be attached to the second surface SA2 of the second member 2. The third piezoelectric element 10-3 may be attached to the first surface SB1 of the third member 3, and the fourth piezoelectric element 10-4 may be may be attached to the second surface SB2 of the third member 3.

Further, the piezoelectric elements are not necessarily attached on any of the first member 1, the second member 2, and the third member 3 as long as preload may be stably provided to the respective piezoelectric elements. Specifically, the piezoelectric elements may not be attached to specific members, but may be sandwiched by the first member 1 and the second member 2 or by the first member 1 and the third member 3 and stably held.

In the above description, the convex portions for efficient preload are provided on the side surfaces SD1 to SD4 of the first member 1, however, not limited to that. For example, regarding the respective wall surfaces 24 of the second member 2, convex portions 26 are respectively protruded on the surfaces on the first member 1 side. Top surfaces 261, 262 of the respective convex portions 26 are surfaces perpendicular to the bottom plate 23. Similarly, regarding the respective wall surfaces 34 of the third member 3, convex portions 36 are respectively protruded on the surfaces on the first member 1 side. Top surfaces 361, 362 of the respective convex portions 36 are surfaces perpendicular to the top plate 33.

In this case, the sensor device 6-1 is sandwiched between the top surface 261 of one convex portion 26 of the two convex portions 26 of the second member 2 and the first side surface SD1 of the first member 1, the sensor device 6-2 is sandwiched between the top surface 262 of the other convex portion 26 of the two convex portions 26 of the second member 2 and the second side surface SD2 of the first member 1, the sensor device 6-3 is sandwiched between the top surface 361 of one convex portion 36 of the two convex portions 36 of the third member 3 and the third side surface SD3 of the first member 1, and the sensor device 6-4 is sandwiched between the top surface 362 of the other convex portion 36 of the two convex portions 36 of the third member 3 and the fourth side surface SD4 of the first member 1.

Namely, in the embodiment, "the first piezoelectric element 10-1 is provided between the first surface SA1 of the second member 2 and the first side surface SD1 of the first member 1" includes the case where the piezoelectric element 10-1 is directly sandwiched by SA1 and SD1 and the case where the piezoelectric element is sandwiched using a convex portion provided on at least one of SA1 and SD1. This applies to the cases where the other piezoelectric elements are sandwiched by the other side surfaces and surfaces.

3. Configuration Example of Piezoelectric Element

Next, the structure of the plurality of piezoelectric elements 10 contained in the force detection apparatus FD and the sensor devices 6 containing the piezoelectric elements 10, and the conversion output circuits 90 connected to the respective piezoelectric elements 10 will be explained.

3.1 Piezoelectric Element

As shown in FIG. 10, the piezoelectric element 10 has four ground electrode layers 11 grounded to the ground (reference potential point), a first sensor 12 that outputs charge Qx in response to an external force (shearing force), a second sensor 13 that outputs charge Qz in response to an external force (compression/tensile force), and a third sensor 14 that outputs charge Qy in response to an external force (shearing force), and the ground electrode layers 11 and the respective sensors 12, 13, 14 are alternately stacked in parallel. The stacking direction LD is a direction orthogonal to a normal line NL2 of the attachment surface 321 (or a normal line NL1 of the attachment surface 231).

In the illustrated configuration, the first sensor 12, the second sensor 13, and the third sensor 14 are stacked from the left side in this order in FIG. 10, however, not limited to that. The stacking order of the sensors 12, 13, 14 is arbitrary.

The ground electrode layers 11 are electrodes grounded to the ground (reference potential point). The constituent material of the ground electrode layer 11 is not particularly limited, and e.g. gold, titanium, aluminum, copper, iron, or an alloy containing the metal is preferable. Among them, particularly, stainless as an iron alloy is preferably used. The ground electrode layer 11 formed using stainless has advantageous durability and corrosion resistance.

The first sensor 12 has a function of outputting charge Qx in response to an external force (shearing force) in a first detection direction orthogonal to the stacking direction LD (first sandwich direction), i.e., in the orthogonal direction as the normal line NL2 (normal line NL1). Namely, the first sensor 12 is adapted to output positive charge or negative charge in response to an external force.

The first sensor 12 has a first piezoelectric layer (first detection plate (first substrate)) 121, a second piezoelectric layer (first detection plate (first substrate)) 123 provided to be opposed to the first piezoelectric layer 121, and an output electrode layer 122 provided between the first piezoelectric layer 121 and the second piezoelectric layer 123.

The first piezoelectric layer 121 is formed using a Y-cut crystal plate and has an x-axis, a y-axis, and a z-axis as crystal axes orthogonal to one another. The y-axis is an axis along the thickness of the first piezoelectric layer 121, the x-axis is an axis along the paper depth in FIG. 10, and the z-axis is an axis in the vertical direction in FIG. 10. In the configuration shown in FIG. 10, regarding the x-axis, a direction toward the paper depth side in FIG. 10 is a positive direction and the opposite direction is a negative direction. Regarding the y-axis, the direction toward the left in FIG. 10 is a positive direction and the opposite direction is a negative direction. Regarding the z-axis, the direction toward the upside in FIG. 10 is a positive direction and the opposite direction is a negative direction.

The first piezoelectric layer 121 formed using crystal has advantageous properties including a wider dynamic range, higher rigidity, higher natural frequency, and higher load resistance. Further, the Y-cut crystal plate generates charge for an external force (shearing force) along the face.

When an external (shearing) force in the positive direction of the x-axis is applied to the surface of the first piezoelectric layer 121, charge is induced within the first piezoelectric layer 121 due to the piezoelectric effect. As a result, positive charge is collected near the surface on the output electrode layer 122 side of the first piezoelectric layer 121, and negative charge is collected near the surface on the ground electrode layer 11 side of the first piezoelectric layer 121. Similarly, when an external force in the negative direction of the x-axis is applied to the surface of the first piezoelectric layer 121, negative charge is collected near the surface on the output electrode layer 122 side of the first piezoelectric layer 121, and positive charge is collected near the surface on the ground electrode layer 11 side of the first piezoelectric layer 121.

The second piezoelectric layer 123 is formed using a Y-cut crystal plate and has an x-axis, a y-axis, and a z-axis as crystal axes orthogonal to one another. The y-axis is an axis along the thickness of the second piezoelectric layer 123, the x-axis is an axis along the paper depth in FIG. 10, and the z-axis is an axis in the vertical direction in FIG. 10. In the configuration shown in FIG. 10, regarding the x-axis, a direction toward the paper near side in FIG. 10 is a positive direction and the opposite direction is a negative direction. Regarding the y-axis, the direction toward the right in FIG.

10 is a positive direction and the opposite direction is a negative direction. Regarding the z-axis, the direction toward the upside in FIG. 10 is a positive direction and the opposite direction is a negative direction.

The second piezoelectric layer 123 formed using crystal has advantageous properties including a wider dynamic range, higher rigidity, higher natural frequency, and higher load resistance like the first piezoelectric layer 121, and, because of the Y-cut crystal plate, charge is generated for an external force (shearing force) along the face.

When an external (shearing) force in the positive direction of the x-axis is applied to the surface of the second piezoelectric layer 123, charge is induced within the second piezoelectric layer 123 due to the piezoelectric effect. As a result, positive charge is collected near the surface on an output electrode layer 122 side of the second piezoelectric layer 123, and negative charge is collected near the surface on the ground electrode layer 11 side of the second piezoelectric layer 123. Similarly, when an external force in the negative direction of the x-axis is applied to the surface of the second piezoelectric layer 123, negative charge is collected near the surface on the output electrode layer 122 side of the second piezoelectric layer 123, and positive charge is collected near the surface on the ground electrode layer 11 side of the second piezoelectric layer 123.

Because of the configuration of the first sensor 12 having the first piezoelectric layer 121 and the second piezoelectric layer 123, the positive charge or negative charge collected near the output electrode layer 122 may be increased compared to the configuration having only one of the first piezoelectric layer 121 and the second piezoelectric layer 123 and the output electrode layer 122. As a result, the charge Qx output from the output electrode layer 122 may be increased.

The output electrode layer 122 has a function of outputting positive charge or negative charge generated within the first piezoelectric layer 121 and the second piezoelectric layer 123 as charge Qx. As described above, when an external force in the positive direction of the x-axis is applied to the surface of the first piezoelectric layer 121 or the surface of the second piezoelectric layer 123, positive charge is collected near the output electrode layer 122. As a result, positive charge Qx is output from the output electrode layer 122. On the other hand, when an external force in the negative direction of the x-axis is applied to the surface of the first piezoelectric layer 121 or the surface of the second piezoelectric layer 123, negative charge is collected near the output electrode layer 122. As a result, negative charge Qx is output from the output electrode layer 122.

Further, it is preferable that the size of the output electrode layer 122 is equal to or larger than the sizes of the first piezoelectric layer 121 and the second piezoelectric layer 123. When the output electrode layer 122 is smaller than the first piezoelectric layer 121 or the second piezoelectric layer 123, a part of the first piezoelectric layer 121 or the second piezoelectric layer 123 is not in contact with the output electrode layer 122. Because of that, it may be impossible to output part of the charge generated in the first piezoelectric layer 121 or the second piezoelectric layer 123 from the output electrode layer 122. As a result, the charge Qx output from the output electrode layer 122 is reduced. Note that the same applies to output electrode layers 132 and 142, which will be described later.

The second sensor 13 has a function of outputting charge Qz in response to an external force (compression/tensile force). Namely, the second sensor 13 is adapted to output positive charge in response to a compression force and output negative charge in response to a tensile force.

The second sensor 13 has a third piezoelectric layer (third substrate) 131, a fourth piezoelectric layer (third substrate) 133 provided to be opposed to the third piezoelectric layer 131, and an output electrode layer 132 provided between the third piezoelectric layer 131 and the fourth piezoelectric layer 133.

The third piezoelectric layer 131 is formed using an X-cut crystal plate and has an x-axis, a y-axis, and a z-axis as crystal axes orthogonal to one another. The x-axis is an axis along the thickness of the third piezoelectric layer 131, the y-axis is an axis in the vertical direction in FIG. 10, and the z-axis is an axis along the paper depth in FIG. 10.

When a compression force in parallel to the x-axis is applied to the surface of the third piezoelectric layer 131, charge is induced within the third piezoelectric layer 131 due to the piezoelectric effect. As a result, positive charge is collected near the surface on the output electrode layer 132 side of the third piezoelectric layer 131, and negative charge is collected near the surface on the ground electrode layer 11 side of the third piezoelectric layer 131. Similarly, when a tensile force in parallel to the x-axis is applied to the surface of the third piezoelectric layer 131, negative charge is collected near the surface on the output electrode layer 132 side of the third piezoelectric layer 131, and positive charge is collected near the surface on the ground electrode layer 11 side of the third piezoelectric layer 131.

The fourth piezoelectric layer 133 is formed using an X-cut crystal plate and has an x-axis, a y-axis, and a z-axis as crystal axes orthogonal to one another. The x-axis is an axis along the thickness of the fourth piezoelectric layer 133, the y-axis is an axis in the vertical direction in FIG. 10, and the z-axis is an axis along the paper depth in FIG. 10.

When a compression force in parallel to the x-axis is applied to the surface of the fourth piezoelectric layer 133, charge is induced within the fourth piezoelectric layer 133 due to the piezoelectric effect. As a result, positive charge is collected near the surface on the output electrode layer 132 side of the fourth piezoelectric layer 133, and negative charge is collected near the surface on the ground electrode layer 11 side of the fourth piezoelectric layer 133. Similarly, when a tensile force in parallel to the x-axis is applied to the surface of the fourth piezoelectric layer 133, negative charge is collected near the surface on the output electrode layer 132 side of the fourth piezoelectric layer 133, and positive charge is collected near the surface on the ground electrode layer 11 side of the fourth piezoelectric layer 133.

The output electrode layer 132 has a function of outputting positive charge or negative charge generated within the third piezoelectric layer 131 and the fourth piezoelectric layer 133 as charge Qz. As described above, when a compression force in parallel to the x-axis is applied to the surface of the third piezoelectric layer 131 or the surface of the fourth piezoelectric layer 133, positive charge is collected near the output electrode layer 132. As a result, positive charge Qz is output from the output electrode layer 132. On the other hand, when a tensile force in parallel to the x-axis is applied to the surface of the third piezoelectric layer 131 or the surface of the fourth piezoelectric layer 133, negative charge is collected near the output electrode layer 132. As a result, negative charge Qz is output from the output electrode layer 132.

The third sensor 14 has a function of outputting charge Qy in response to an external force (shearing force) in a second detection direction orthogonal to the stacking direction LD (second sandwich direction) and intersecting with the first detection direction of the external force acting when the first sensor 12 outputs charge Qx. Namely, the third sensor 14 is adapted to output positive charge or negative charge in response to an external force.

The third sensor 14 has a fifth piezoelectric layer (second detection plate (second substrate)) 141, a sixth piezoelectric layer (second detection plate (second substrate)) 143 provided to be opposed to the fifth piezoelectric layer 141, and an output electrode layer 142 provided between the fifth piezoelectric layer 141 and the sixth piezoelectric layer 143.

The fifth piezoelectric layer 141 is formed using a Y-cut crystal plate and has an x-axis, a y-axis, and a z-axis as crystal axes orthogonal to one another. The y-axis is an axis along the thickness of the fifth piezoelectric layer 141, the x-axis is an axis in the vertical direction in FIG. 10, and the z-axis is an axis along the paper depth in FIG. 10. In the configuration shown in FIG. 10, regarding the x-axis, a direction toward the upside in FIG. 10 is a positive direction and the opposite direction is a negative direction. Regarding the y-axis, the direction toward the left in FIG. 10 is a positive direction and the opposite direction is a negative direction. Regarding the z-axis, the direction toward the paper near side in FIG. 10 is a positive direction and the opposite direction is a negative direction.

The fifth piezoelectric layer 141 formed using crystal has advantageous properties including a wider dynamic range, higher rigidity, higher natural frequency, and higher load resistance. Further, the Y-cut crystal plate generates charge for an external force (shearing force) along the face.

When an external force in the positive direction of the x-axis is applied to the surface of the fifth piezoelectric layer 141, charge is induced within the fifth piezoelectric layer 141 due to the piezoelectric effect. As a result, positive charge is collected near the surface on the output electrode layer 142 side of the fifth piezoelectric layer 141, and negative charge is collected near the surface on the ground electrode layer 11 side of the fifth piezoelectric layer 141. Similarly, when an external force in the negative direction of the x-axis is applied to the surface of the fifth piezoelectric layer 141, negative charge is collected near the surface on the output electrode layer 142 side of the fifth piezoelectric layer 141, and positive charge is collected near the surface on the ground electrode layer 11 side of the fifth piezoelectric layer 141.

The sixth piezoelectric layer 143 is formed using a Y-cut crystal plate and has an x-axis, a y-axis, and a z-axis as crystal axes orthogonal to one another. The y-axis is an axis along the thickness of the sixth piezoelectric layer 143, the x-axis is an axis in the vertical direction in FIG. 10, and the z-axis is an axis along the paper depth in FIG. 10. In the configuration shown in FIG. 10, regarding the x-axis, a direction toward the downside in FIG. 10 is a positive direction and the opposite direction is a negative direction. Regarding the y-axis, the direction toward the right in FIG. 10 is a positive direction and the opposite direction is a negative direction. Regarding the z-axis, the direction toward the paper near side in FIG. 10 is a positive direction and the opposite direction is a negative direction.

The sixth piezoelectric layer 143 formed using crystal has advantageous properties including a wider dynamic range, higher rigidity, higher natural frequency, and higher load resistance like the fifth piezoelectric layer 141, and, because of the Y-cut crystal plate, charge is generated for an external force (shearing force) along the face.

When an external force in the positive direction of the x-axis is applied to the surface of the sixth piezoelectric layer 143, charge is induced within the sixth piezoelectric layer 143 due to the piezoelectric effect. As a result, positive charge is collected near the surface on an output electrode layer 142 side of the sixth piezoelectric layer 143, and negative charge is collected near the surface on the ground electrode layer 11 side of the sixth piezoelectric layer 143. Similarly, when an external force in the negative direction of the x-axis is applied to the surface of the sixth piezoelectric layer 143, negative charge is collected near the surface on the output electrode layer 142 side of the sixth piezoelectric layer 143, and positive charge is collected near the surface on the ground electrode layer 11 side of the sixth piezoelectric layer 143.

In the piezoelectric element 10, as seen from the stacking direction LD, the respective x-axes of the first piezoelectric layer 121 and the second piezoelectric layer 123 and the respective x-axes of the fifth piezoelectric layer 141 and the sixth piezoelectric layer 143 intersect. Further, as seen from the stacking direction LD, the respective z-axes of the first piezoelectric layer 121 and the second piezoelectric layer 123 and the respective z-axes of the fifth piezoelectric layer 141 and the sixth piezoelectric layer 143 intersect.

The output electrode layer 142 has a function of outputting positive charge or negative charge generated within the fifth piezoelectric layer 141 and the sixth piezoelectric layer 143 as charge Qy. As described above, when an external force in the positive direction of the x-axis is applied to the surface of the fifth piezoelectric layer 141 or the surface of the sixth piezoelectric layer 143, positive charge is collected near the output electrode layer 142. As a result, positive charge Qy is output from the output electrode layer 142. On the other hand, when an external force in the negative direction of the x-axis is applied to the surface of the fifth piezoelectric layer 141 or the surface of the sixth piezoelectric layer 143, negative charge is collected near the output electrode layer 142. As a result, negative charge Qx is output from the output electrode layer 142.

As described above, in the piezoelectric element 10, the first sensor 12, the second sensor 13, and the third sensor 14 are stacked so that the force detection directions of the respective sensors are orthogonal to one another. Thereby, the respective sensors may induce charge in response to force components orthogonal to one another. Accordingly, the piezoelectric element 10 may output three charges Qx, Qy, Qz in response to the respective external forces along the x-axis, the y-axis, and the z-axis.

Further, as shown in FIGS. 9A and 9B, the first member 1 and the second member 2, the first member 1 and the third member 3 are connected and fastened by the pressurizing bolts 71. Note that "fastening" by the pressurizing bolts 71 is performed while predetermined amounts of movement of the two objects to be fastened are allowed relative to each other. Specifically, the first member 1 and the second member 2, the first member 1 and the third member 3 are fastened by the pressurizing bolts 71 while predetermined amounts of movement are allowed relative to each other.

Eight (plurality) of pressurizing bolts 71 are provided, and two of them are provided on both sides with the sensor device 6-1 in between. Namely, part (two) of the pressurizing bolts 71 are provided around the sensor device 6-1 and pressurize the sensor device 6-1. The same applies to the other sensor devices 6-2 to 6-4, and the example using two pressurizing bolts 71 for each sensor device 6 is considered in the embodiment. Note that the preload directions by the respective pressurizing bolts 71 are in parallel to the stacking direction LD.

Internal threads 241 to be screwed with the respective pressurizing bolts 71 are provided on the side surfaces of the first member 1. The pressurizing bolts 71 may be inserted into the internal threads 241 of the first member 1 from the second member 2 (or the third member 3) side with the respective sensor devices 6 sandwiched between the first member 1 and the second member 2 (or the third member 3). Thereby, pressure having a predetermined magnitude is applied, i.e., preload is provided to each piezoelectric element 10, to the package 60 housing the piezoelectric element 10 in the direction orthogonal to the side surface of the first member 1. When a shearing force acts on the piezoelectric element 10, friction forces are reliably generated between the layers forming the piezoelectric element 10, and thereby, charge may be reliably detected.

As shown in FIG. 8, the respective pressurizing bolts 71 penetrate the analog circuit boards 4. Pipes 43 formed using an insulating material such as a resin material are fixed by e.g. fitting in the parts of the analog circuit boards 4 through which the pressurizing bolts 71 penetrate. The constituent material of the pressurizing bolts 71 is not particularly limited, and e.g. various resin materials, various metal materials, etc. may be used.

3.2 Sensor Device

The sensor device 6 has the piezoelectric element 10 and the package 60 housing the piezoelectric element 10.

As shown in FIG. 8, the package 60 has a base part 61 with a concave portion 611, and a lid member 62 bonded to the base part 61. The piezoelectric element 10 is placed in the concave portion 611 of the base part 61, and the concave portion 611 of the base part 61 is sealed by the lid member 62. Thereby, the piezoelectric element 10 may be protected and the highly-reliable force detection apparatus FD may be provided. Note that the top surface of the piezoelectric element 10 is in contact with the lid member 62. Further, the lid member 62 of the package 60 is provided on the side of the second member 2 (or the third member 3), and the base part 61 is provided on the side of the side surface of the first member 1, and the base part 61 is fixed to the analog circuit board 4. According to the configuration, the base part 61 and the lid member 62 are sandwiched by the top surface 161 to 164 of the first member 1 and the wall surface 24 of the second member 2 (or the wall surface 34 of the third member 3) in the sandwich direction DS and pressurized, and further, the piezoelectric element 10 is sandwiched by the base part 61 and the lid member 62 in the sandwich direction DS and pressurized.

The constituent material of the base part 61 is not particularly limited, and e.g. an insulating material such as ceramics may be used. The constituent material of the lid member 62 is not particularly limited, and e.g. various metal materials such as stainless steel may be used. The constituent material of the base part 61 and the constituent material of the lid member 62 may be the same or different.

The planar shape of the package 60 is not particularly limited, and square in the embodiment. The other shapes of the package 60 include e.g. other polygonal shapes such as a pentagonal shape, a circular shape, an oval shape, etc. In the case where the package 60 has a polygonal shape, for example, the corners may be rounded or obliquely cut off.

In the embodiment, the lid member 62 has a plate-like shape, and a part between its center part 625 and outer peripheral part 626 bends and the center part 625 projects toward the wall surface 24 of the second member 2 or the wall surface 34 of the third member 3. The shape of the center part 625 is not particularly limited, and the same shape as that of the piezoelectric element 10 in the plan view from the side surface of the first member 1, i.e., square in the embodiment. Note that both the upper surface and the lower surface of the center part 625 of the lid member 62 are flat surfaces.

A plurality of terminals (not shown) electrically connected to the piezoelectric element 10 are provided in end portions of the lower surface of the base part 61 of the package 60. The respective terminals are electrically connected to the analog circuit board 4, and thereby, the piezoelectric element 10 and the analog circuit board 4 are electrically connected.

A hole 41 into which the convex portion 16 is inserted is formed in a part of the analog circuit board 4 in which the piezoelectric element 10 is placed. The hole 41 is a through hole penetrating the analog circuit board 4.

3.3 Conversion Output Circuit

As shown in FIG. 11, conversion output circuits 90a, 90b, 90c are connected to each piezoelectric element 10. The conversion output circuit 90a has the function of converting the charge Qy output from the piezoelectric element 10 into the voltage Vy. The conversion output circuit 90b has the function of converting the charge Qz output from the piezoelectric element 10 into the voltage Vz. The conversion output circuit 90c has the function of converting the charge Qx output from the piezoelectric element 10 into the voltage Vx. The conversion output circuits 90a, 90b, 90c are the same and the conversion output circuit 90c will be representatively explained as below.

The conversion output circuit 90c has the function of converting the charge Qx output from the piezoelectric element 10 into the voltage Vx and outputting the voltage Vx. The conversion output circuit 90c has an operational amplifier 91, a capacitor 92, and a switching element 93. The first input terminal (negative input) of the operational amplifier 91 is connected to the output electrode layer 122 of the piezoelectric element 10, and the second input terminal (positive input) of the operational amplifier 91 is grounded to the ground (reference potential point). The output terminal of the operational amplifier 91 is connected to the external force detection circuit 40. The capacitor 92 is connected between the first input terminal and the output terminal of the operational amplifier 91. The switching element 93 is connected between the first input terminal and the output terminal of the operational amplifier 91 and parallel-connected to the capacitor 92. Further, the switching element 93 is connected to a drive circuit (not shown), and the switching element 93 executes switching operation according to on/off signals from the drive circuit.

When the switching element 93 is off, the charge Qx output from the piezoelectric element 10 is stored in the capacitor 92 having a capacitance Cl and output to the external force detection circuit 40 as the voltage Vx. Then, when the switching element 93 is turned on, the terminals of the capacitor 92 are short-circuited. As a result, the charge Qx stored in the capacitor 92 is discharged to zero coulombs and the voltage V output to the external force detection circuit 40 is zero volts. Turning on of the switching element 93 is referred to as resetting of the conversion output circuit 90c. Note that the voltage Vx output from the ideal conversion output circuit 90c is proportional to the stored amount of charge Qx output from the piezoelectric element 10.

The switching element 93 is e.g. a MOSFET (Metal Oxide Semiconductor Field Effect Transistor), or a semiconductor switch, an MEMS switch, or the like. These switches are smaller and lighter than mechanical switches and advantageous for reduction in size and weight of the force detection apparatus FD. As below, as a representative example, the case of using the MOSFET as the switching element 93 will be explained. Note that, as shown in FIGS. 3A to 3C, those switches are mounted on the conversion output circuit 90*c* and the conversion output circuits 90*a*, 90*b*, and additionally, may be mounted on an AD converter 401.

The switching element 93 has a drain electrode, a source electrode, and a gate electrode. One of the drain electrode and the source electrode of the switching element 93 is connected to the first input terminal of the operational amplifier 91, and the other of the drain electrode and the source electrode is connected to the output terminal of the operational amplifier 91. The gate electrode of the switching element 93 is connected to the drive circuit (not shown).

The same drive circuit may be connected to the switching elements 93 of the respective conversion output circuits 90*a*, 90*b*, 90*c*, or respective different drive circuits may be connected thereto. All of the synchronized on/off signals are input from the drive circuits to the respective switching elements 93. Thereby, the operations of the switching elements 93 of the respective conversion output circuits 90*a*, 90*b*, 90*c* are synchronized. Namely, the on/off timing of the switching elements 93 of the respective conversion output circuits 90*a*, 90*b*, 90*c* is synchronized.

4. External Force Detection Processing in External Force Detection Circuit and Processing Unit The external force detection circuit 40 has a function of detecting applied external forces based on the voltages Vy1 to Vy4 output from the respective conversion output circuit 90*a*, the voltages Vz1 to Vz4 output from the respective conversion output circuit 90*b*, and the voltages Vx1 to Vx4 output from the respective conversion output circuit 90*c*. The external force detection circuit 40 has the AD converter 401 connected to the conversion output circuits (conversion circuits) 90*a*, 90*b*, 90*c* and a processing unit (calculation unit, calculation circuit) 402 connected to the AD converter 401.

The AD converter 401 has a function of converting the voltages Vx1 to Vx4, Vy1 to Vy4, Vz1 to Vz4 from analog signals into the digital signals. The voltages Vx1 to Vx4, Vy1 to Vy4, Vz1 to Vz4 digitally converted by the AD converter 401 are input to the processing unit 402.

The processing unit 402 performs respective processing e.g. correction for eliminating the differences in sensitivity among the respective conversion output circuits 90*a*, 90*b*, 90*c* etc. on the digitally converted voltages Vx1 to Vx4, Vy1 to Vy4, Vz1 to Vz4. Then, the processing unit 402 outputs output values of the force detection apparatus FD based on the stored amounts of charge Qx1 to Qx4, Qy1 to Qy4, Qz1 to Qz4 output from the piezoelectric elements 10. As described above, when the force detection apparatus FD is used as a six-axis force sensor, the output values are six values of Fx, Fy, Fz, Mx, My, Mz.

A technique of obtaining external forces Fx, Fy, Fz, Mx, My, Mz in the processing unit 402 will be explained. First, supposing that a direction from the first side surface SD1 to the second side surface SD2 is a first direction DR1 and a direction from the third side surface SD3 to the fourth side surface SD4 is a second direction DR2, the processing unit 402 obtains an external force in the first direction DR1 based on the forces detected by the third piezoelectric element 10-3 and the fourth piezoelectric element 10-4.

Figure 12A:
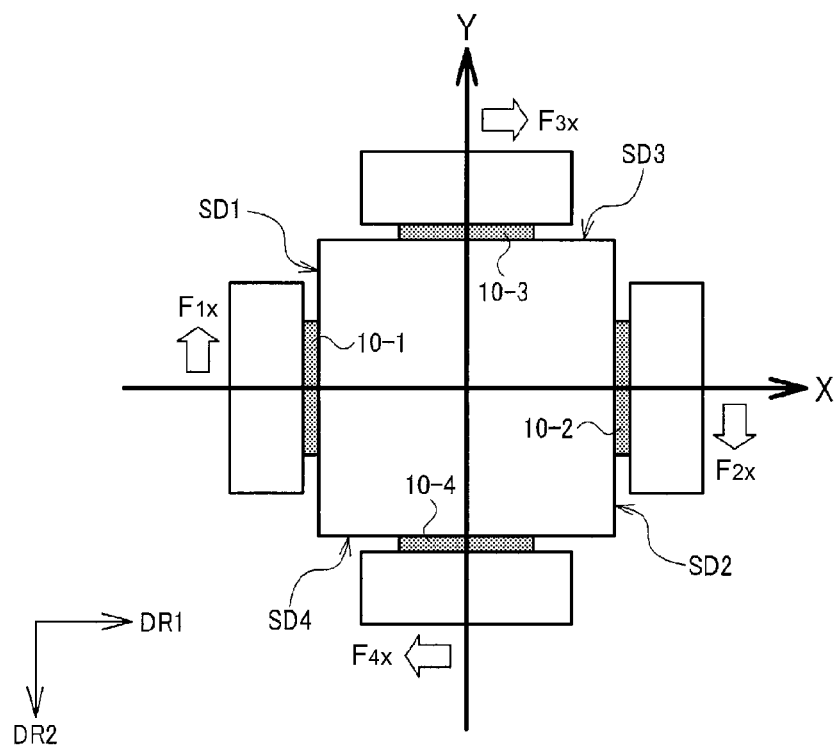
FIGS. 12A and 12B are explanatory diagrams of a technique of obtaining a translational force in the embodiment.

In an example of FIG. 12A, DR1 corresponds to the positive direction of the X-axis of the apparatus coordinate system set in the force detection apparatus FD and DR2 corresponds to the negative direction of the Y-axis, however, various modifications may be made to the relationship between the DR1, DR2 and the apparatus coordinate system. Here, it is important that an external force in the direction DR1 is a compression/tensile force for the piezoelectric element 10-1 and the piezoelectric element 10-2, and the equal force acts as a shearing force for the third piezoelectric element 10-3 and the fourth piezoelectric element 10-4.

Here, the example in which the external force in DR1 coincides with Fx as one of the outputs of the force detection apparatus FD is shown, and the value of Fx may be obtained by the following equation (2) using the shearing force $F_{3x}$ of the third piezoelectric element 10-3 and the shearing force $F_{4x}$ of the fourth piezoelectric element 10-4. Note that the directions of $F_{3x}$ etc. are the directions shown in FIGS. 12A and 12B. $F_{1x}$, $F_{2x}$, $F_{3x}$, $F_{4x}$ are forces in the direction along the plane determined by DR1, DR2 (the XY-plane of the apparatus coordinate system) of the shearing forces of the respective piezoelectric elements, and $F_{1y}$, $F_{2y}$, $F_{3y}$, $F_{4y}$ are forces in the direction intersecting with (orthogonal to) the plane of the shearing forces of the respective piezoelectric elements.

$$Fx = F_{3x} - F_{4x} \tag{2}$$

Similarly, the processing unit 402 obtains an external force in the second direction DR2 based on the forces detected by the first piezoelectric element 10-1 and the second piezoelectric element 10-2. Here, the example in which the DR2 and the negative direction of the Y-axis of the apparatus coordinate system are aligned is shown, and Fy as one of the outputs of the force detection apparatus FD may be obtained by the following equation (3). Naturally, the force detection apparatus FD according to the embodiment is not limited to one that outputs only one of Fx and Fy, but may output both Fx and Fy.

$$Fy = F_{1x} - F_{2x} \tag{3}$$

Supposing that a direction intersecting with the first direction DR1 and the second direction DR2 is a third direction DR3, the processing unit 402 obtains an external force in the third direction DR3 based on the forces detected by the first to fourth piezoelectric elements.

Figure 12B:
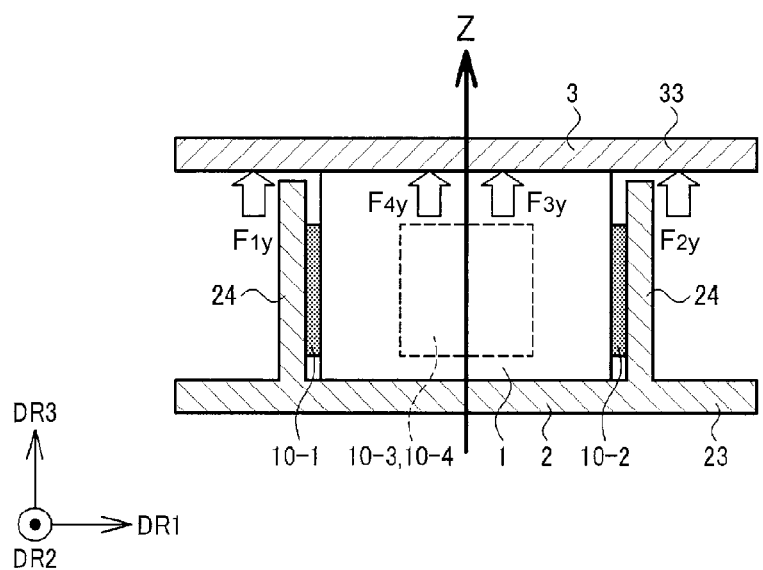

In the example of FIG. 12B, DR3 is aligned with the Z-axis of the apparatus coordinate system. In this case, the compression force from the upper surface direction of the Z-axis is balanced with the shearing forces of the third, fourth piezoelectric elements sandwiched between the first member 1 and itself via the third member 3. Further, the force is balanced with the shearing forces of the first, second piezoelectric elements sandwiched between the second member 2 and itself via the first member 1. Namely, the sum of the shearing forces of the first to fourth piezoelectric elements is twice the compression force from the upside. Accordingly, in the case where, of the shearing forces of the first to fourth piezoelectric elements, the directions of the components in the Z-axis direction in the apparatus coordinate system (in the arrangement example of FIG. 12B, the Y-axis components of the respective element coordinate systems) $F_{1y}$, $F_{2y}$, $F_{3y}$, $F_{4y}$ are defined as shown in FIG. 12B, Fz as one of the outputs of the force detection apparatus FD may be obtained by the following equation (4). Note that, in the following equation (4), all of the $F_{1y}$, $F_{2y}$, $F_{3y}$, $F_{4y}$ are used, however, modifications using only $F_{1y}$, $F_{2y}$ or $F_{3y}$, $F_{4y}$ may be made.

$$Fz = -0.5(F_{1y} + F_{2y} + F_{3y} F_{4y}) \tag{4}$$

Figure 13A:
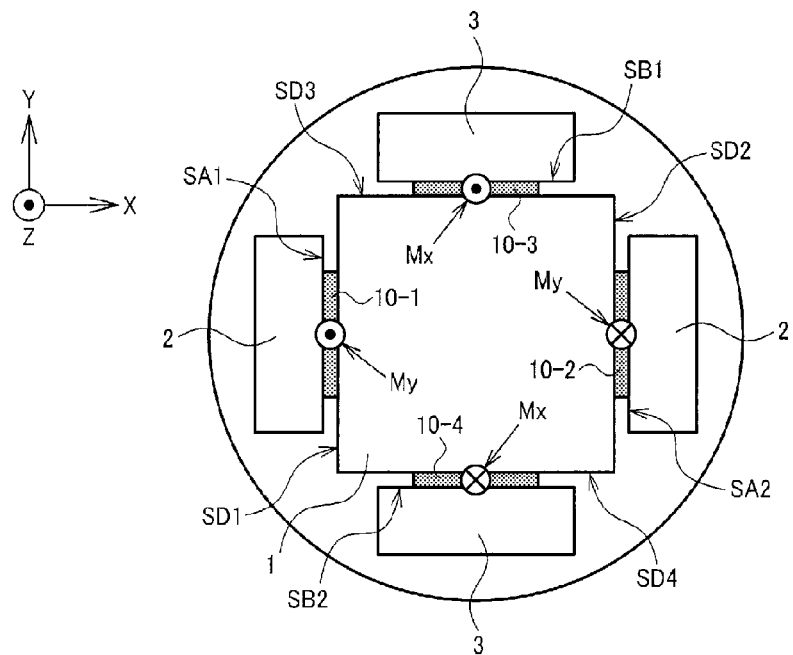
FIGS. 13A and 13B are explanatory diagrams of a technique of obtaining moment in the embodiment.

Further, as shown in FIG. 13A, moment about the X-axis may be expressed using the shearing forces $F_{3y}$, $F_{4y}$ of the third, fourth piezoelectric elements, and moment about the Y-axis may be expressed using the shearing forces $F_{1y}$, $F_{2y}$ of the first, second piezoelectric elements. Specifically, the processing unit 402 may obtain Mx, My using the following equations (5), (6). Note that, in the following equations (5), (6) and the following equation (7), which will be described later, the distance from the origin of the apparatus coordinate system to the respective piezoelectric elements is set to r.

$$Mx = r(F_{3y} - F_{4y}) \quad (5)$$

$$My = r(F_{1y} - F_{2y}) \quad (6)$$

Figure 13B:
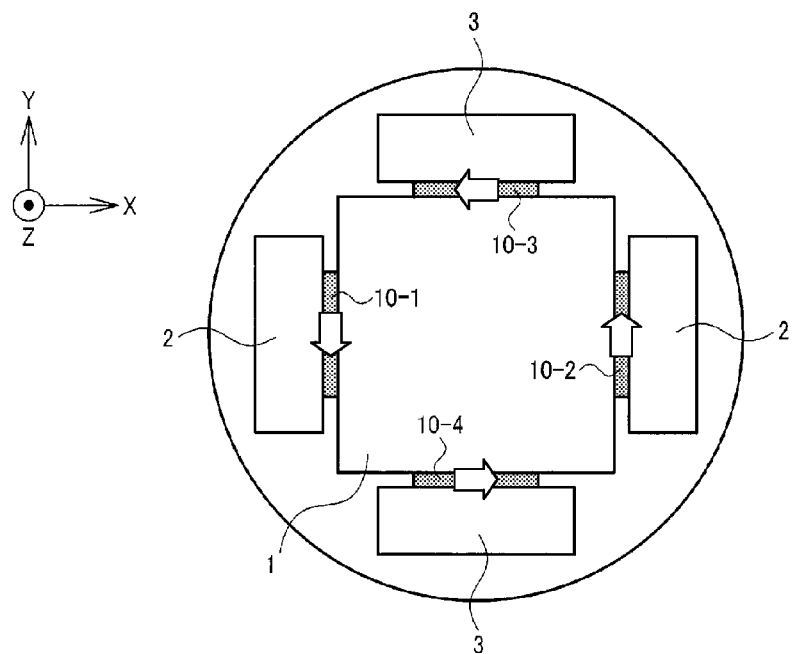

As shown in FIG. 13B, moment about the Z-axis may be obtained using the shearing forces $F_{1x}$, $F_{2x}$ of the first, second piezoelectric elements or the shearing forces $F_{3x}$, $F_{4x}$ of the third, fourth piezoelectric elements, or all of the forces. Here, like Fz, the sum of all of $F_{1x}$, $F_{2x}$, $F_{3x}$, $F_{4x}$ is obtained, and a value of a half of the sum is Mz. Specifically, the processing unit 402 may obtain Mz using the following equation (7).

$$Mz = -0.5r(F_{1x} + F_{2x} + F_{3x} + F_{4x}) \quad (7)$$

As described above, in the force detection apparatus FD, when detecting external forces, the detection may be performed without using the second sensor 13 (charge Qz) that is likely to be influenced by temperature fluctuations, i.e., noisy. Therefore, the force detection apparatus FD is less likely to be influenced by temperature fluctuations, e.g. an apparatus with reduced influence to 1/20 or less than that of the force detection apparatus of related art. Thereby, the force detection apparatus FD may detect external forces accurately and stably even under environments with severe temperature changes.

Further, the symmetry of the devices are not assumed unlike the comparative example, and there is another advantage that very high accuracy is not required in processing and assembly.

6. Modified Example

As above, the example in which the force detection apparatus FD according to the embodiment is used as the six-axis force sensor is explained, but not limited to that. For example, the force detection apparatus FD according to the embodiment may be a three-axis force sensor that outputs translational forces in the respective axis directions of X, Y, Z.

When the force detection apparatus FD is a three-axis force sensor, the number of piezoelectric elements 10 contained in the force detection apparatus FD may be less than four, and, for example, the force detection apparatus FD may contain two piezoelectric elements. Specifically, the force detection apparatus according to the embodiment may be one having a structure formed by removing the third piezoelectric element 10-3 and the fourth piezoelectric element 10-4 (and the structures relating to the third, fourth piezoelectric elements as appropriate) from the structure described above using FIGS. 8 to 9B.

Namely, the force detection apparatus FD according to the embodiment may include the first member 1, the second member 2, and the third member 3, the second member 2 and the first member 1 may sandwich one or more piezoelectric elements (the first piezoelectric element 10-1 in the embodiment) and the third member 3 and the first member 1 may sandwich one or more different piezoelectric elements (the second piezoelectric element 10-2 in the embodiment) from the one or more piezoelectric elements sandwiched by the second member 2 and the first member 1.

In this case, of Fx, Fy, Fz as outputs of the force detection apparatus FD, Fx may be obtained as a shearing force of the second piezoelectric element 10-2 and Fy may be obtained as a shearing force of the first piezoelectric element 10-1. Further, Fz may be obtained as the shearing force of the first piezoelectric element 10-1 or the shearing force of the second piezoelectric element 10-2 (or, like the above equation (4), a half of the sum of the two shearing forces).

Also, in the modified example, external forces may be obtained from shearing forces of the respective piezoelectric elements, and thus, the accuracy may be made higher and symmetry is not required for the structure of the force detection apparatus FD.

7. Application Examples of Force Detection Apparatus of Embodiment

The technique of the embodiment is not limited to the force detection apparatus FD, but may be applied to a robot including the force detection apparatus FD. One embodiment of the robot according to the invention will be explained using FIGS. 14 and 15.

Figure 14:
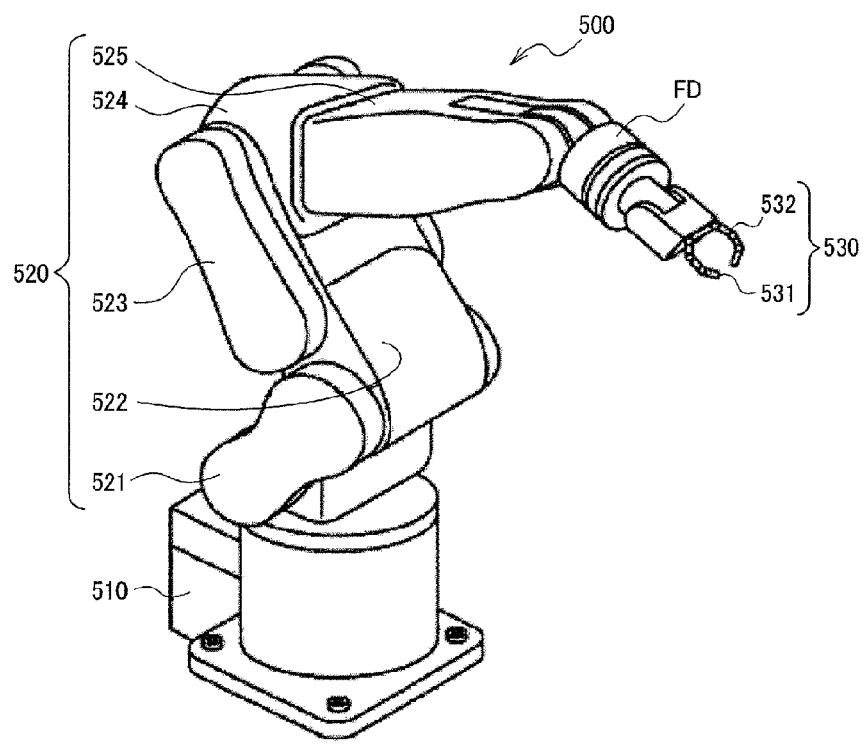
FIG. 14 shows a configuration example of a robot (single-arm robot) according to the embodiment.

FIG. 14 shows an example of a single-arm robot using the force detection apparatus FD according to the invention. A single-arm robot 500 in FIG. 14 includes a base 510, an arm 520, an end effector 530 provided on the distal end side of the arm 520, and the force detection apparatus FD provided between the arm 520 and the end effector 530. As the force detection apparatus FD, the above described one is used.

The base 510 has a function of housing actuators (not shown) that generate power to rotate the arm 520, a control unit (not shown) that controls the actuators, etc. Further, the base 510 is fixed to e.g. a floor, a wall, a ceiling, a movable carriage, or the like.

The arm 520 has a first arm element 521, a second arm element 522, a third arm element 523, a fourth arm element 524, and a fifth arm element 525, and is formed by rotatably coupling the adjacent arms. The arm 520 is driven by multiple rotation or bending around the coupling parts of the respective arm elements by the control of the control unit.

The end effector 530 has a function of grasping an object. The end effector 530 has a first finger 531 and a second finger 532. The end effector 530 reaches a predetermined operation position by driving of the arm 520, then, the separate distance between the first finger 531 and the second finger 532 is adjusted, and thereby, the object may be grasped.

Note that, here, the end effector 530 is a hand, however, the invention is not limited to that. The other examples of the end effector include e.g. a part inspection instrument, a part carrying instrument, a part processing instrument, a part assembly instrument, and a measuring instrument.

The force detection apparatus FD has a function of detecting external forces applied to the end effector 530. The forces detected by the force detection apparatus FD are fed back to the control unit of the base 510, and thereby, the single-arm robot 500 may execute more precise operation. Further, by the forces detected by the force detection apparatus FD, the single-arm robot 500 may sense contact of the end effector 530 with an obstacle or the like. Accordingly, the obstacle avoidance operation, the object damage avoidance operation, etc. that have been difficult by position control of related art may be easily performed, and the single-arm robot 500 may execute the operation more safely.

Note that, in the illustrated configuration, the arm 520 is formed by the five arm elements in total, however, the invention is not limited to that. The invention covers the case where the arm 520 is formed by one arm element, the case where the arm is formed by two to four arm elements, the case where the arm is formed by six or more arm elements.

Figure 15:
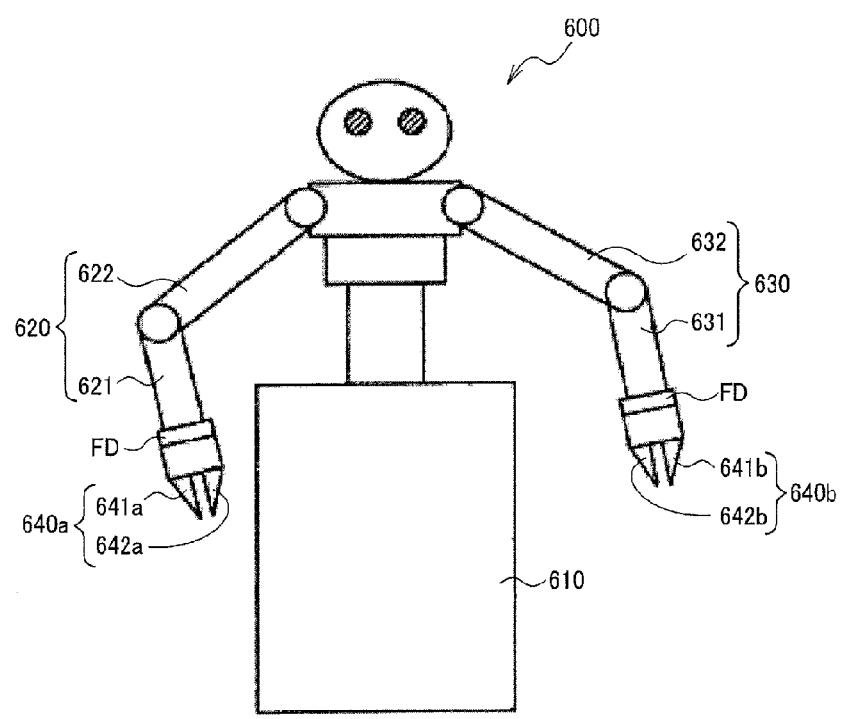
FIG. 15 shows a configuration example of a robot (dual-arm robot) according to the embodiment.

FIG. 15 shows an example of a multi-arm robot using the force detection apparatuses FD according to the invention. A multi-arm robot 600 in FIG. 15 includes a base 610, a first arm 620, a second arm 630, a first end effector 640a provided on the distal end side of the first arm 620, a second end effector 640b provided on the distal end side of the second arm 630, and the force detection apparatuses FD provided between the first arm 620 and the first end effector 640a and between the second arm 630 and the second end effector 640b.

The base 610 has a function of housing actuators (not shown) that generate power to rotate the first arm 620 and the second arm 630, a control unit (not shown) that controls the actuators, etc. Further, the base 610 is fixed to e.g. a floor, a wall, a ceiling, a movable carriage, or the like.

The first arm 620 is formed by rotatably coupling a first arm element 621 and a second arm element 622. The second arm 630 is formed by rotatably coupling a first arm element 631 and a second arm element 632. The first arm 620 and the second arm 630 are driven by multiple rotation or bending around the coupling parts of the respective arm elements by the control of the control unit.

The first, second end effectors 640a, 640b have functions of grasping objects. The first end effector 640a has a first finger 641a and a second finger 642a. The second end effector 640b has a first finger 641b and a second finger 642b. The first end effector 640a reaches a predetermined operation position by driving of the first arm 620, then, the separate distance between the first finger 641a and the second finger 642a is adjusted, and thereby, the object may be grasped. Similarly, the second end effector 640b reaches a predetermined operation position by driving of the second arm 630, then, the separate distance between the first finger 641b and the second finger 642b is adjusted, and thereby, the object may be grasped.

The force detection apparatuses FD have functions of detecting external forces applied to the first, second end effectors 640a, 640b. The forces detected by the force detection apparatuses FD are fed back to the control unit of the base 610, and thereby, the multi-arm robot 600 may execute operation more precisely. Further, by the forces detected by the force detection apparatuses FD, the multi-arm robot 600 may sense contact of the first, second end effectors 640a, 640b with an obstacle or the like. Accordingly, the obstacle avoidance operation, the object damage avoidance operation, etc. that have been difficult by position control of related art may be easily performed, and the multi-arm robot 600 may execute the operation more safely.

Note that, in the illustrated configuration, the number of arms is two in total, however, the invention is not limited to that. The invention covers the case where the multi-arm robot 600 have three or more arms.

The force detection apparatus according to the invention is not limited to one used for the robot, but may be applied to an electronic part carrying apparatus, an electronic part inspection apparatus, a part processing apparatus, a mobile unit, a measuring instrument including a vibration gauge, an acceleration meter, a gravity meter, a dynamometer, a seismometer, or an inclinometer, an input device, etc.

The example in which the number of sensor devices provided in the force detection apparatus FD is four is explained, however, not limited to that. For example, the number may be two as described above in the modified example, or three, five, or more.

The embodiment is explained in detail as described above, and it could be understood by a person skilled in the art that many modifications may be made without substantially departing from the new matter and the effects of the invention. Therefore, the invention covers those modified examples. For example, in the specification or the drawings, the terms described with different terms in the broader sense or synonymous terms at least once may be replaced by the different terms in any part of the specification or the drawings. Further, the configuration and operation of the force detection apparatus are not limited to those explained in the embodiment, but various modifications may be made.

The entire disclosure of Japanese Patent Application No. 2014-214249, filed Oct. 21, 2014 is expressly incorporated by reference herein.

What is claimed is:

1. A force detection apparatus comprising:
    a single piece first member;
    a single piece second member;
    a single piece third member;
    a first piezoelectric element positioned between the first member and the second member;
    a second piezoelectric element located between the first member and the second member;
    a third piezoelectric element positioned between the first member and the third member; and
    a fourth piezoelectric element positioned between the first member and the third member,
    wherein
    the first piezoelectric element, the third piezoelectric element, the second piezoelectric element, and the fourth piezoelectric element are provided in a clockwise order on the first member when viewed from a direction orthogonal to a plane passing through the first, second, and third piezoelectric elements.

2. A robot comprising the force detection apparatus according to claim 1.

3. The force detection apparatus according to claim 1,
    wherein the first member is configured with first, second, third, and fourth side surfaces, and the first and second side surfaces intersect the third and fourth side surfaces,
    the second member has a first surface opposed to the first side surface of the first member and a second surface opposed to the second side surface of the first member,
    the third member has a first surface opposed to the third side surface of the first member and a second surface opposed to the fourth side surface of the first member,
    the first piezoelectric element is provided between the first surface of the second member and the first side surface of the first member,
    the second piezoelectric element is provided between the second surface of the second member and the second side surface of the first member,
    the third piezoelectric element is provided between the first surface of the third member and the third side surface of the first member, and
    the fourth piezoelectric element is provided between the second surface of the third member and the fourth side surface of the first member.

4. A robot comprising the force detection apparatus according to claim 3.

5. The force detection apparatus according to claim 3,
    wherein the second member has a third surface intersecting with the first surface and the second surface of the second member,
    the third member has a third surface intersecting with the first surface and the second surface of the third member,
    the third surface of the second member faces a lower surface of the first member, and
    the third surface of the third member faces an upper surface of the first member.

6. A robot comprising the force detection apparatus according to claim 5.

7. The force detection apparatus according to claim 3, wherein the first piezoelectric element is attached to the first surface of the second member,
the second piezoelectric element is attached to the second surface of the second member,
the third piezoelectric element is attached to the first surface of the third member, and
the fourth piezoelectric element is attached to the second surface of the third member.

8. A robot comprising the force detection apparatus according to claim 7.

9. The force detection apparatus according to claim 3, wherein the first piezoelectric element is attached to the first side surface of the first member,
the second piezoelectric element is attached to the second side surface of the first member,
the third piezoelectric element is attached to the third side surface of the first member, and
the fourth piezoelectric element is attached to the fourth side surface of the first member.

10. A robot comprising the force detection apparatus according to claim 9.

11. The force detection apparatus according to claim 3, further comprising a processing unit,
wherein a direction from the first side surface to the second side surface is defined as a first direction, and a direction from the third side surface to the fourth side surface is defined as a second direction, and
the processing unit is configured to obtain an external force in the first direction based on forces detected by the third piezoelectric element and the fourth piezoelectric element.

12. A robot comprising the force detection apparatus according to claim 11.

13. The force detection apparatus according to claim 11, wherein a direction intersecting the first direction and the second direction is defined as a third direction, and
the processing unit is configured to obtain an external force in the third direction based on forces detected by the first, second, third, and fourth piezoelectric elements.

14. A robot comprising the force detection apparatus according to claim 13.

15. The force detection apparatus according to claim 3, further comprising a processing unit,
wherein a direction from the first side surface to the second side surface is defined as a first direction, and a direction from the third side surface to the fourth side surface is defined as a second direction, and
the processing unit is configured to obtain an external force in the second direction based on forces detected by the first piezoelectric element and the second piezoelectric element.

16. A robot comprising the force detection apparatus according to claim 15.

* * * * *